(12) United States Patent
Lee et al.

(10) Patent No.: US 11,612,875 B2
(45) Date of Patent: Mar. 28, 2023

(54) SULFUR-DOPED CARBONACEOUS POROUS MATERIALS

(71) Applicant: THE UNIVERSITY OF LIVERPOOL, Liverpool (GB)

(72) Inventors: Jet-Sing Lee, Liverpool (GB); Tom Hasell, Liverpool (GB)

(73) Assignee: The University of Liverpool, Liverpool (GB)

(*) Notice: Subject to any disclaimer, the term of this patent is extended or adjusted under 35 U.S.C. 154(b) by 395 days.

(21) Appl. No.: 16/629,813

(22) PCT Filed: Jul. 11, 2018

(86) PCT No.: PCT/GB2018/051977
§ 371 (c)(1),
(2) Date: Jan. 9, 2020

(87) PCT Pub. No.: WO2019/012278
PCT Pub. Date: Jan. 17, 2019

(65) Prior Publication Data
US 2021/0138431 A1 May 13, 2021

(30) Foreign Application Priority Data
Jul. 11, 2017 (GB) .................................... 1711157

(51) Int. Cl.
*B01J 20/20* (2006.01)
*B01J 20/28* (2006.01)
*B01J 20/30* (2006.01)
*B01J 21/18* (2006.01)
*C01B 32/318* (2017.01)
*C01B 32/342* (2017.01)
*B01J 35/10* (2006.01)
*B01J 37/08* (2006.01)
*B01D 53/02* (2006.01)
*C02F 1/28* (2006.01)
*C25B 11/091* (2021.01)
*C02F 101/20* (2006.01)

(52) U.S. Cl.
CPC .............. *B01J 20/20* (2013.01); *B01D 53/02* (2013.01); *B01J 20/2808* (2013.01); *B01J 20/28066* (2013.01); *B01J 20/28073* (2013.01); *B01J 20/28083* (2013.01); *B01J 20/3078* (2013.01); *B01J 20/3085* (2013.01); *B01J 21/18* (2013.01); *B01J 35/1028* (2013.01); *B01J 35/1042* (2013.01); *B01J 35/1057* (2013.01); *B01J 35/1061* (2013.01); *B01J 37/084* (2013.01); *C01B 32/318* (2017.08); *C01B 32/342* (2017.08); *C02F 1/288* (2013.01); *C25B 11/091* (2021.01); *B01D 2253/102* (2013.01); *B01D 2253/25* (2013.01); *B01D 2253/306* (2013.01); *B01D 2253/308* (2013.01); *B01D 2253/311* (2013.01); *B01D 2257/108* (2013.01); *B01D 2257/504* (2013.01); *B01D 2257/7025* (2013.01); *C01P 2002/54* (2013.01); *C01P 2002/72* (2013.01); *C01P 2004/03* (2013.01); *C01P 2004/04* (2013.01); *C01P 2006/12* (2013.01); *C01P 2006/14* (2013.01); *C01P 2006/16* (2013.01); *C02F 1/281* (2013.01); *C02F 1/283* (2013.01); *C02F 2101/20* (2013.01)

(58) Field of Classification Search
CPC .................. B01J 20/20; B01J 20/28066; B01J 20/28073; B01J 20/2808; B01J 20/28083; B01J 20/3078; B01J 20/3085; B01J 21/18; B01J 35/1028; B01J 35/1042; B01J 35/1047; B01J 35/1061; B01J 37/084; C01B 32/318; C01B 32/342; C01B 11/091; B01D 53/02; C02F 1/288; C25B 11/091
See application file for complete search history.

(56) References Cited

U.S. PATENT DOCUMENTS

| 5,064,805 | A | * | 11/1991 | Otowa | C01B 32/348 95/143 |
|---|---|---|---|---|---|
| 5,639,707 | A | | 6/1997 | Lewis | |
| 9,023,528 | B2 | * | 5/2015 | Liang | H01M 4/1397 429/300 |
| 9,597,656 | B2 | * | 3/2017 | Tour | B01J 20/3491 |
| 9,604,849 | B2 | * | 3/2017 | Tour | C01B 32/342 |
| 9,722,245 | B2 | * | 8/2017 | Liang | H01M 4/0471 |
| 9,776,165 | B2 | * | 10/2017 | Tour | B01J 20/3491 |
| 10,494,575 | B2 | * | 12/2019 | Al-Hooshani | C10G 25/003 |
| 2005/0173297 | A1 | * | 8/2005 | Toida | B01J 20/165 208/299 |
| 2006/0014639 | A1 | * | 1/2006 | Bandosz | B01J 20/22 423/220 |

(Continued)

FOREIGN PATENT DOCUMENTS

CN 104148013 11/2014
CN 105680060 5/2018
(Continued)

OTHER PUBLICATIONS

Parker et al., J. of Materials Chem. A, (2017), v, 11682-11692.*
Parker et al., J. of Materials Chem. A, (2017), v, 11682-11692 (Supplemental information).*
(Continued)

*Primary Examiner* — Yong L Chu
(74) *Attorney, Agent, or Firm* — Barnes & Thornburg LLP; Jessamine G. Pilcher

(57) ABSTRACT

The present invention relates to novel sulfur-doped carbonaceous porous materials. The present invention also relates to processes for the preparation of these materials and to the use of these materials in applications such as gas adsorption, mercury and gold capture, gas storage and as catalysts or catalyst supports.

10 Claims, 13 Drawing Sheets

(56) References Cited

U.S. PATENT DOCUMENTS

| | | | |
|---|---|---|---|
| 2008/0176743 A1* | 7/2008 | Heschel | B01J 20/20 |
| | | | 502/423 |
| 2014/0287036 A1* | 9/2014 | Hashitera | A61P 1/10 |
| | | | 424/456 |
| 2016/0001260 A1 | 1/2016 | Tour et al. | |

FOREIGN PATENT DOCUMENTS

| | | |
|---|---|---|
| CN | 106881069 | 4/2020 |
| GN | 103721520 A1 | 4/2014 |
| WO | 2008143831 A2 | 11/2008 |
| WO | 2013106712 A1 | 7/2013 |

OTHER PUBLICATIONS

Parker, D.J., et al. "Low cost and renewable sulfur-polymers by inverse vulcanisation and their potential for mercury capture," Journal of Materials Chemistry A, 2017, vol. 5 pp. 11682-11692.

Marsh, H. and Rodriguez-Reinoso, F. "Chapter 6, Activation Processes (Chemical)," 2006, Activated Carbon, pp. 322-365.

Saha, D., et al. "Noncompetitive and Competitive Adsorption of Heavy Metals in Sulfur-Functionalized Ordered Mesoporous Carbon," Applied Materials & Interfaces, 2016, vol. 8 pp. 34132-34142.

Sevilla, M., et al. "Preparation and hydrogen storage capacity of highly porous activated carbon materials derived from polythiophene," International Journal of Hydrogen Energy, 2011, vol. 36 pp. 15658-15663.

Xia, Y., et al. "Preparation of sulfur-doped microporous carbons for the storage of hydrogen and carbon dioxide," Carbon, 2012, vol. 50 pp. 5543-5553.

Bear, J.C., et al. "Porous carbons from inverse vulcanised polymers," Microporous and Mesoporous Materials, 2016, vol. 232 pp. 189-195.

Hwang, C-C., et al. "Capturing carbon dioxide as a polymer from natural gas," Natrure Communications, 2014, 7 pages.

* cited by examiner

SULFUR-DOPED CARBONACEOUS POROUS MATERIALS

CROSS-REFERENCE TO RELATED APPLICATIONS

This application is a national stage entry made under 35 U.S.C. § 371 of PCT International Application No. PCT/GB2018/051977, filed Jul. 11, 2018, which claims priority to Great Britain Patent Application No. 1711157.6, filed Jul. 11, 2017, the entire disclosure of each of which is incorporated herein by reference.

INTRODUCTION

The present invention relates to sulfur-doped carbonaceous porous materials. The present invention also relates to processes for the preparation of these materials and to the use of these materials in applications, such as, for example, gas adsorption, mercury and gold capture, gas storage and as catalysts or catalyst supports.

BACKGROUND OF THE INVENTION

Microporous materials have many important applications, such as to store hydrogen to allow its use as a greener fuel, carbon dioxide capture, to prevent global warming from the production of $CO_2$ by burning of conventional fuels for power, and the filtration of toxic compounds from waste water and gas streams to prevent environmental pollution. To be relevant to these applications, any potential material must be not only effective, but must also be low enough in cost to allow large scale production and use. Currently, many microporous materials, such as metal-organic frameworks or covalent organic frameworks, suffer from a high cost of production due to the cost of the starting materials—often comprising costly metals or rare organic molecules requiring complex synthesis.

Porous carbonaceous materials have attracted great interest in recent years due to their versatility in gas storage,[1] separations,[2] catalysis,[3] and energy storage applications.[4,5] The popularity of porous carbons is led by their relatively low cost, scalability, and ease of preparation from a variety of natural and synthetic precursors. These materials possess high surface areas and pore volumes, good thermal, chemical, and mechanical stability, high electrical and thermal conductivity, and good processability.[6] Heteroatom doping of carbon materials has been suggested as the "Next Big Thing" in materials science and has gained a great deal of attention in the last few years.[7]

While carbonaceous materials that contain hydrogen, oxygen and nitrogen elements have been heavily studied, the use of sulfur has been explored to a much lesser extent. The properties of porous carbons are influenced strongly by their surface functionalities. S-doped carbonaceous materials have most commonly been produced by melt diffusion of sulfur into porous carbon materials,[8] but this approach requires an additional synthetic step and commonly removes all porous functionalities of the material. Thus, there remains a need for new methodologies into the synthesis of s-doped carbonaceous materials, such as, for example, using a carbonisation precursor with a high initial S-content to produce a porous, S-doped carbon directly.

Though sulfur is known to have many applications, supply still greatly outweighs demand, thus creating large unwanted stockpiles and a global issue in the petrochemical industry known as the "excess sulfur problem".[9]

Sulfur is a waste by-product from the purification of crude oil and gas reserves, which produces ~70 million tons of elemental sulfur annually. This quantity will likely increase as demand for energy pushes the need to use more contaminated petroleum feed-stocks. There has been interest in the use of this un-tapped, low-cost sulfur into useful materials for applications, with the most significant advancement being a recent development known as "inverse vulcanisation".[9-11] The process enables the production of high sulfur containing polymers by the ring-opening of S8—a cyclic ring of 8 sulfur atoms, with the addition of a small organic molecule crosslinker, typically a diene. This crosslinks the sulfur chains and stabilizes the product against depolymerisation.

Due to sulfur being a by-product of the petroleum industry, converting waste sulfur into useful polymers and related materials is an advance in waste valorisation that is presently required.[12]

Co-polymerisation of sulfur with renewable monomers represents an additional contribution to sustainability, as these reactions are often solvent free and benefit from full atom economy, further supplementing their Green Chemistry credentials.[12] Suggested applications for these high sulfur polymers are diverse.[9,13] Optical applications arise from the high refractive index and IR transparency of the materials.[14] Polymeric electrodes can be produced from inverse vulcanisation to give Li—S batteries with enhanced capacities and lifetimes.[15] Sulfur polymers have also shown potential for mercury capture,[16] which is enhanced if they are made macroporous.[17,18]

To date, only two reports have described microporous materials synthesised directly from elemental sulfur. The first involved inverse vulcanisation of sulfur with either diisopropenyl benzene (DIB) or limonene, followed by carbonisation.[19] The second route involved the reaction of aromatic methyl and amine-substituted monomers with elemental sulfur directly at elevated temperatures to make benzothiazole polymers.[20] Both of these routes gave materials with narrow pore size distributions, which can be beneficial in gas separations, but also with relatively low Brunauer-Emmett-Teller surface areas ($SA_{BET}$): 537 $m^2$ $g^{-1}$ (by nitrogen) as the highest for carbonised Sulfur-DIB co-polymer, and 751 $m^2$ $g^{-1}$ for the benzothiazole polymers (by argon). The organic precursors for the S-DIB and benzothiazole polymers are, however, considerably more expensive in comparison with sulfur, making the final S-doped polymeric high in cost, which has prevented the wide spread production and use of these materials.

Therefore, there remains a need for new, cheap and easily accessible sulfur-doped porous polymeric materials for use in applications such as adsorption, separation and gas storage.

The present invention was devised with the foregoing in mind.

SUMMARY OF THE INVENTION

According to a first aspect of the present invention there is provided a process for the preparation of a sulfur-doped carbonaceous porous material, the process comprising the steps of:
 i) preparing a sulfur-based polymer by reacting elemental sulfur with one or more organic crosslinking agents, wherein the organic crosslinking agent(s) comprises two or more carbon-carbon double bonds;
 ii) carbonising the sulfur-based polymer of step (i) in the presence of at least one porosity enhancement agent.

According to another aspect of the present invention, there is provided a sulfur-doped carbonaceous porous material obtainable by, obtained by or directly obtained by the process as defined herein.

According to another aspect of the present invention, there is provided a sulfur-doped carbonaceous porous material comprising:
  i) greater than or equal to 5 wt % sulfur;
  ii) a pore volume of greater than or equal to 0.75 cm$^3$ g$^{-1}$; and
  iii) a Brunauer-Emmett-Teller (BET) surface area of greater than or equal to 1250 m$^2$ g$^{-1}$.

According to another aspect of the present invention, there is provided the use of a sulfur-doped carbonaceous porous material, as defined herein, in gas adsorption.

According to another aspect of the present invention, there is provided the use of a sulfur-doped carbonaceous porous material, as defined herein, in gas storage.

According to another aspect of the present invention, there is provided the use of a sulfur-doped carbonaceous porous material, as defined herein, as a solid catalyst.

According to another aspect of the present invention, there is provided the use of a sulfur-doped carbonaceous porous material, as defined herein, as a catalyst support.

According to another aspect of the present invention, there is provided the use of a sulfur-doped carbonaceous porous material, as defined herein, in the capture of mercury.

According to another aspect of the present invention, there is provided the use of a sulfur-doped carbonaceous porous material, as defined herein, in the capture of precious/noble metals (e.g. gold, silver, platinum, and palladium). Suitably, there is provided the use of a sulfur-doped carbonaceous porous material, as defined herein, in the capture of gold.

Features, including optional, suitable, and preferred features in relation to one aspect of the invention may also be features, including optional, suitable and preferred features in relation to any other aspects of the invention.

DETAILED DESCRIPTION OF THE INVENTION

Definitions

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The term "elemental sulfur" used herein will be understood to refer to any allotropic form of sulfur, including but not limited to, $S_{18}$, $S_{12}$, $S_8$, $S_7$ and $S_6$. In an embodiment, the form of elemental sulfur used is $S_8$.

The term "carbonaceous" used herein will be understood to refer to materials comprising carbon. In certain embodiments, the term "carbonaceous" refers to materials consisting essentially of carbon (i.e. comprising greater than or equal to 65 wt % carbon, suitably, greater than or equal to 75 wt % carbon).

Where the quantity or concentration of a particular component is specified as a weight (or mass) percentage (wt % or % w/w), said weight (or mass) percentage refers to the percentage of said component by weight (or mass) relative to the total weight (or mass) of the composition as a whole. It will be understood by those skilled in the art that the sum of weight (or mass) percentages of all components of a composition will total 100 wt %. However, where not all components are listed (e.g. where compositions are said to "comprise" one or more particular components), the weight (or mass) percentage balance may optionally be made up to 100 wt % by unspecified ingredients (e.g. a diluent, such as water, or other non-essentially but suitable additives).

Processes of the Present Invention

As described hereinbefore, the present invention provides a process for the preparation of a sulfur-doped carbonaceous porous material, the process comprising the steps of:
  i) preparing a sulfur-based polymer by reacting elemental sulfur with one or more organic crosslinking agents, wherein the organic crosslinking agent(s) comprises two or more carbon-carbon double bonds;
  ii) carbonising the sulfur-based polymer of step (i) in the presence of at least one porosity enhancement agent.

The process of the present invention provides access to an array of novel sulfur-doped carbonaceous porous materials. Furthermore, the novel sulfur-doped carbonaceous porous materials provided by the process of the present invention may be utilised in numerous applications, such as, for example, gas adsorption and storage, mercury capture, gold capture and as catalyst supports.

Step (i)

It will be appreciated that any suitable reaction conditions may be used to prepare the sulfur-based polymer of step (i) of the process defined herein.

The reaction conditions used to prepare the sulfur-based polymer of step (i) of the process will vary according to the organic crosslinking agent(s) used. A person skilled in the art will be able to select suitable reaction conditions (e.g. temperature, pressures, reaction times, concentration etc.) to use in the preparation of the sulfur-based polymer of step (i) of the process.

In an embodiment, the sulfur-based polymer of step (i) is formed by reacting elemental sulfur (i.e. $S_8$) with one or more organic crosslinking agents at a temperature of greater than or equal to 120° C. Suitably, the sulfur-based polymer of step (i) is formed by reacting elemental sulfur (i.e. $S_8$) with one or more organic crosslinking agents at a temperature of greater than or equal to 140° C. Most suitably, the sulfur-based polymer of step (i) is formed by reacting elemental sulfur (i.e. $S_8$) with one or more organic crosslinking agents at a temperature of greater than or equal to 160° C.

In another embodiment, the reaction of elemental sulfur (i.e. $S_8$) with one or more organic crosslinking agents to form the sulfur-based polymer of step (i) is carried out in the absence of a solvent.

In another embodiment, the reaction of elemental sulfur (i.e. $S_8$) with one or more organic crosslinking agents to form the sulfur-based polymer of step (i) is agitated (i.e. stirred).

In certain embodiments, an additional step of curing the reaction product of elemental sulfur and the one or more organic crosslinking agents is conducted. Suitably, the reaction product of elemental sulfur and the one or more organic crosslinking agents is cured a temperature of between 100° C. and 150° C. for between 1 hour and 36 hours. More suitably, the reaction product of elemental sulfur and the one or more organic crosslinking agents is cured a temperature of between 120° C. and 150° C. for between 6 hours and 24 hours. Most suitably, the reaction product of elemental sulfur and the one or more organic crosslinking agents is cured a temperature of between 135° C. and 145° C. for between 6 hours and 18 hours (i.e. 12 hours).

In a further embodiment, the mass ratio of elemental sulfur to organic crosslinking agent in step (i) of the process is between 20:80 and 95:5. Suitably, the mass ratio of elemental sulfur to organic crosslinking agent in step (i) of the process is between 30:70 and 90:10. More suitably, the mass ratio of elemental sulfur to organic crosslinking agent in step (i) of the process is between 30:70 and 80:20. Even more suitably, the mass ratio of elemental sulfur to organic crosslinking agent in step (i) of the process is between 30:70 and 70:30. Most suitably, the mass ratio of elemental sulfur to organic crosslinking agent in step (i) of the process is between 40:60 and 60:40 (e.g. 50:50).

In certain embodiments, the mass ratio of elemental sulfur to organic crosslinking agent in step (i) of the process is between 20:80 and 50:50. Suitably, the mass ratio of elemental sulfur to organic crosslinking agent in step (i) of the process is between 20:80 and 40:60. Most suitably, the mass ratio of elemental sulfur to organic crosslinking agent in step (i) of the process is between 20:80 and 30:70.

In a particular embodiment, the one or more organic crosslinking agents of step (i) of the process comprise two double bonds (i.e. they are dienes) or three double bonds (i.e. they are trienes). Suitably, the one or more organic crosslinking agents of step (i) of the process comprises two double bonds (i.e. they are dienes).

It will be appreciated that any suitable organic crosslinking agent comprising two or more double bonds may be used to form the sulfur-based polymer of step (i) of the process. The person skilled in the art will appreciate that either a single organic crosslinking agent may be used, or a combination (mixture) of organic crosslinking agents may be used. Suitably, the sulfur-based polymer of step (i) is formed by reacting elemental sulfur with one organic crosslinking agent.

In an embodiment, the one or more organic crosslinking agents of the present invention have a molecular weight of less than 1000. Suitably, the one or more organic crosslinking agents of the present invention have a molecular weight of less than 500. More suitably, the one or more organic crosslinking agents of the present invention have a molecular weight of less than 300. Yet more suitably, the one or more organic crosslinking agents of the present invention have a molecular weight of less than 200. Most suitably the one or more organic crosslinking agents of the present invention have a molecular weight of less than 150.

In an embodiment, the organic crosslinking agent is selected from dicyclopentadiene (DCPD), di-isopropenyl-benzene (DIB) tri-isopropenylbenzene (TIB), divinyl benzene (DVB), terpenes, limonene, terpinolene, myrcene, farnesene, isoprene, diallyl disulphide, tri-vinyl cyclohexane, farnesol, linoleic acid, or unsaturated vegetable oils (i.e. linseed oil). Suitably, the organic crosslinking agent is selected from dicyclopentadiene (DCPD), di-isopropenyl-benzene (DIB) tri-isopropenylbenzene (TIB), divinyl benzene (DVB), limonene, terpinolene, myrcene, farnesene, isoprene, diallyl disulphide, tri-vinyl cyclohexane, farnesol, or linoleic acid. More suitably, the organic crosslinking agent is selected from dicyclopentadiene (DCPD), di-isopropenylbenzene (DIB) or limonene. Yet more suitably, the organic crosslinking agent is selected from dicyclopentadiene (DCPD) or di-isopropenylbenzene (DIB). Most suitably, the organic crosslinking agent is dicyclopentadiene (DCPD).

In another embodiment, a blend (mixture) of organic crosslinking agents are used. A non-limiting list of suitable blends (mixtures) of organic crosslinking agents are given below:

dicyclopentadiene (DCPD) and limonene;
dicyclopentadiene (DCPD) and di-isopropenyl benzene (DIB);
dicyclopentadiene (DCPD), limonene and di-isopropenyl benzene (DIB);
dicyclopentadiene (DCPD) and myrcene;
dicyclopentadiene (DCPD) and farnesene; and
dicyclopentadiene (DCPD) and farnesol.

It will be appreciated that the reaction between elemental sulfur and the one or more organic crosslinking agents to form the sulfur-based polymer of step (i) of the process may be conducted for any suitable duration. Suitably, the reaction between elemental sulfur and the one or more organic crosslinking agents, to form the sulfur-based polymer of step (i) of the process, is conducted for between 5 minutes and 12 hours. More suitably, the reaction between elemental sulfur and the one or more organic crosslinking agents, to form the sulfur-based polymer of step (i) of the process, is conducted for between 5 minutes and 6 hours. Yet more suitably, the reaction between elemental sulfur and the one or more organic crosslinking agents, to form the sulfur-based polymer of step (i) of the process, is conducted for between 5 minutes and 3 hours. Most suitably, the reaction between elemental sulfur and the one or more organic crosslinking agents, to form the sulfur-based polymer of step (i) of the process, is conducted for between 5 minutes and 1 hour.

In a further embodiment, the sulfur-based polymer of step (i) of the process is a solid.

In yet a further embodiment, the sulfur-based polymer of step (i) of the process is insoluble in one or more of the following solvents: acetone, acetonitrile, chloroform, hexane, methanol, tetrahydrofuran, toluene or water. Suitably, the sulfur-based polymer of step (i) of the process is insoluble in all of the following solvents: acetone, acetonitrile, chloroform, hexane, methanol, tetrahydrofuran, toluene and water.

Step (ii)

It will be understood that the porosity enhancement agent of step (ii) of process may be any agent that is capable of enhancing the porosity of the final sulfur-doped carbonaceous porous material. Suitable porosity enhancement agents will be apparent to those skilled in the art. A non-limiting list of suitable porosity enhancement agents include inorganic bases (i.e. potassium hydroxide), inorganic acids (e.g. phosphoric acid), inorganic salts (i.e. NaCl), carbon dioxide (i.e. supercritical foaming) and other aerosols. Suitably, the porosity enhancement agent is selected from an inorganic base (i.e. potassium hydroxide), an inorganic acid (e.g. phosphoric acid), or an inorganic salt (i.e. NaCl). Most suitably, the porosity enhancement agent is an inorganic base (i.e. potassium hydroxide).

It will be appreciated that when carbon dioxide and/or an aerosol are used as the porosity enhancement agent, contact with the sulfur-based polymer may be conducted either prior to or during carbonisation, suitably prior to carbonisation.

In a particular embodiment, the at least one porosity enhancement agent is selected from potassium hydroxide, phosphoric acid, sodium hydroxide, sodium chloride, calcium chloride, magnesium chloride or zinc chloride. Suitably, the at least one porosity enhancement agent is selected from potassium hydroxide, sodium hydroxide or sodium chloride.

In another embodiment, the porosity enhancement agent is an inorganic base. Non-limiting examples of suitable inorganic bases include, potassium hydroxide (KOH), sodium hydroxide (NaOH), lithium hydroxide (LiOH), rubidium hydroxide (RbOH), caesium hydroxide (CsOH), magnesium hydroxide ($Mg(OH)_2$), calcium hydroxide ($Ca(OH)_2$), potassium carbonate ($K_2CO_3$), sodium carbonate ($Na_2CO_3$), aluminium hydroxide ($Al(OH)_3$), zinc hydroxide ($Zn(OH)_2$) or barium hydroxide ($Ba(OH)_2$). Suitably, the inorganic base is selected from potassium hydroxide (KOH), sodium hydroxide (NaOH) or lithium hydroxide (LiOH). Most suitably, the inorganic base is potassium hydroxide (KOH).

In a particular embodiment, step (ii) of the process is conducted in the presence of one porosity enhancement agent. In another embodiment, step (ii) of the process is conducted in the presence of two or more porosity enhancement agents (e.g. in the presence of two porosity enhancement agents).

It will be appreciated that the sulfur-based polymer of step (i) and the inorganic porosity enhancement agent of step (ii) may be mixed together prior to carbonisation. Mixing may be conducted using any suitable apparatus and for any suitable time period. It will be understood that mixing the sulfur-based polymer of step (i) and the inorganic porosity enhancement agent of step (ii) together prior to carbonisation maximises the dispersion of the inorganic porosity enhancement throughout the sample of sulfur-based polymer which, following carbonisation, can aid in the generation of a broad distribution of pore sizes in the final sulfur-doped carbonaceous porous material.

In an embodiment, the sulfur-based polymer is ground prior to carbonisation. Suitably, the sulfur-based polymer is mechanically ground prior to carbonisation (i.e. by using a pestle and mortar, mill, or blender).

In certain embodiments, the porosity enhancement agent is selected from an inorganic base (e.g. KOH), an inorganic acid (e.g. $H_3PO_4$) or an inorganic salt (e.g. NaCl) and the sulfur-based polymer and the porosity enhancement agent are ground together prior to carbonisation. Suitably, the sulfur-based polymer and the porosity enhancement agent are ground together using a pestle and mortar, or mill, prior to carbonisation.

In other embodiments, the porosity enhancement agent is selected from an inorganic base (e.g. KOH), an inorganic acid (e.g. $H_3PO_4$) or an inorganic salt (e.g. NaCl) and the sulfur-based polymer and the porosity enhancement agent are ground separately, before being mixed together prior to carbonisation.

In another embodiment, the carbonisation of step (ii) is conducted at a temperature of between 500° C. and 1200° C.

Suitably, the carbonisation of step (ii) is conducted at a temperature of between 500° C. and 1000° C. More suitably, the carbonisation of step (ii) is conducted at a temperature of between 550° C. and 950° C. Yet more suitably, the carbonisation of step (ii) is conducted at a temperature of between 650° C. and 900° C. Even more suitably, the carbonisation of step (ii) is conducted at a temperature of between 650° C. and 850° C. Most suitably, the carbonisation of step (ii) is conducted at a temperature of between 700° C. and 800° C.

In yet another embodiment, the carbonisation of step (ii) is carried out under an inert atmosphere. It will be appreciated that any inert atmosphere may be used. Non-limiting examples of suitable inert atmospheres include nitrogen, argon, helium, neon, krypton, xenon and radon. Suitably, the inert atmosphere is a nitrogen or argon atmosphere, most suitably, nitrogen.

It will be understood that in using an inert atmosphere, the inert gas must ideally have a purity of greater than or equal to 99%. More suitably, the inert gas has a purity of greater than or equal to 99.9%. Most suitably, the inert gas has a purity of greater than or equal to 99.99%.

In yet another embodiment, the sulfur-based polymer of step (i) is carbonised for a duration of between 5 minutes and 5 hours. Suitably, the sulfur-based polymer of step (i) is carbonised for a duration of between 30 minutes and 5 hours. More suitably, the sulfur-based polymer of step (i) is carbonised for a duration of between 1 hour and 4 hours. Most suitably, the sulfur-based polymer of step (i) is carbonised for a duration of between 2 hours and 3 hours.

In still another embodiment, the sulfur-based polymer of step (i) is carbonised for a duration of at least 30 minutes. Suitably, the sulfur-based polymer of step (i) is carbonised for a duration of at least 1 hour. Most suitably, the sulfur-based polymer of step (i) is carbonised for a duration of at least 2 hours.

In another embodiment, the mass ratio of sulfur-based polymer to porosity enhancement agent in step (ii) of the process is between 10:1 and 1:10. Suitably, the mass ratio of sulfur-based polymer to porosity enhancement agent in step (ii) of the process is between 5:1 and 1:5. More suitably, the mass ratio of sulfur-based polymer to porosity enhancement agent in step (ii) of the process is between 3:1 and 1:3. Yet more suitably, the mass ratio of sulfur-based polymer to porosity enhancement agent in step (ii) of the process is between 2:1 and 1:2. Even more suitably, the mass ratio of sulfur-based polymer to porosity enhancement agent in step (ii) of the process is between 2:1 and 1:1. Most suitably, the mass ratio of sulfur-based polymer to porosity enhancement agent in step (ii) of the process is 1:1.

Sulfur-Doped Carbonaceous Porous Materials of the Present Invention

In another aspect, the present invention provides a sulfur-doped carbonaceous porous material obtainable by, obtained by or directly obtained by any process of the present invention defined herein.

The process of the present invention advantageously provides novel sulfur-doped carbonaceous porous materials with a high surface area and/or high pore volume.

In an embodiment, the sulfur-doped carbonaceous porous materials of the present invention have a Brunauer-Emmett-Teller (BET) surface area of greater than or equal to 1000 $m^2$ $g^{-1}$. Suitably, the sulfur-doped carbonaceous porous materials of the present invention have a BET surface area of greater than or equal to 1250 $m^2$ $g^{-1}$, more suitably, greater than or equal to 500 $m^2$ $g^{-1}$, yet more suitably greater than or equal to 1500 m$^2$ g$^{-1}$, and even more suitably greater than or equal to 1750 m$^2$ g$^{-1}$, and most suitably, greater than or equal to 2000 m$^2$ g$^{-1}$.

In another embodiment, the sulfur-doped carbonaceous porous materials of the present invention have a pore volume of greater than or equal to 0.75 cm$^3$ g$^{-1}$. Suitably, the sulfur-doped carbonaceous porous materials of the present invention have a pore volume of greater than or equal to 0.85 cm$^3$ g$^{-1}$, more suitably, greater than or equal to 0.9 cm$^3$ g$^{-1}$ and most suitably greater than or equal to 0.95 cm$^3$ g$^{-1}$.

In yet another embodiment, the sulfur-doped carbonaceous porous material comprises greater than or equal to 5 wt % sulfur. Suitably, the sulfur-doped carbonaceous material comprises greater than or equal to 8 wt % sulfur, more suitably, greater than or equal to 10 wt % sulfur, and most suitably, greater than or equal to 12 wt % sulfur.

In still another embodiment, the sulfur-doped carbonaceous porous material comprises between 5 wt % and 50 wt % sulfur. Suitably, the sulfur-doped carbonaceous porous material comprises between 5 wt % and 30 wt % sulfur. More suitably, the sulfur-doped carbonaceous porous material comprises between 5 wt % and 25 wt % sulfur. Yet more suitably, the sulfur-doped carbonaceous porous material comprises between 5 wt % and 20 wt % sulfur. Most suitably, the sulfur-doped carbonaceous porous material comprises between 10 wt % and 15 wt % sulfur.

In a further embodiment, the sulfur-doped carbonaceous porous material comprises between 65 wt % and 95 wt % carbon. Suitably, the sulfur-doped carbonaceous porous material comprises between 70 wt % and 90 wt % carbon, more suitably, between 70 wt % and 85 wt % carbon, and most suitably, between 75 wt % and 85 wt % carbon.

In an embodiment, the sulfur-doped carbonaceous porous material comprises greater than or equal to 90 wt % carbon, hydrogen and sulfur. Suitably, the sulfur-doped carbonaceous porous material comprises greater than or equal to 95 wt % carbon, hydrogen and sulfur. More suitably, the sulfur-doped carbonaceous porous material comprises greater than or equal to 99 wt % carbon, hydrogen and sulfur. Most suitably, the sulfur-doped carbonaceous porous material comprises greater than or equal to 99.5 wt % carbon, hydrogen and sulfur.

In another embodiment, the sulfur-doped carbonaceous porous material consists essentially of carbon, hydrogen and sulfur. Suitably, the sulfur-doped carbonaceous porous material consists of carbon, hydrogen and sulfur. More suitably, the sulfur-doped carbonaceous porous material consists entirely of carbon, hydrogen and sulfur.

In certain embodiments, the sulfur-doped carbonaceous porous material is characterised in that the Powder X-Ray Diffraction (PXRD) pattern has a (broad) diffraction peak at a 2θ value of 25°, with an error range in 2θ value of ±2°.

In other embodiments, the sulfur-doped carbonaceous porous material is characterised in that the Powder X-Ray Diffraction (PXRD) pattern has a (broad) diffraction peak at a 2θ value of 43°, with an error range in 2θ value of ±2°.

Particular sulfur-doped carbonaceous porous materials include any of the materials exemplified in the present application, and, in particular, any material characterised in that the Powder X-Ray Diffraction (PXRD) pattern thereof is as shown in any one of traces 4K-S-DCPD-750 or 1K-S-DCPD-750 in FIG. 10.

In another aspect of the present invention, there is provided a sulfur-doped carbonaceous porous material comprising:
  i) greater than or equal to 5 wt % sulfur;
  ii) a pore volume of greater than or equal to 0.75 cm$^3$ g$^{-1}$; and
  iii) a Brunauer-Emmett-Teller (BET) surface area of greater than or equal to 1250 m$^2$ g$^{-1}$.

In an embodiment, the sulfur-doped carbonaceous porous material comprises micropores and mesopores.

In another embodiment, the sulfur-doped carbonaceous porous material has a micropore volume of greater than or equal to 0.25 cm$^3$ g$^{-1}$. Suitably, the sulfur-doped carbonaceous porous material has a micropore volume of greater than or equal to 0.35 cm$^3$ g$^{-1}$. Most suitably, the sulfur-doped carbonaceous porous material has a micropore volume of greater than or equal to 0.45 cm$^3$ g$^{-1}$.

In a further embodiment, the sulfur-doped carbonaceous porous material is a solid.

It will be understood that features, including optional, suitable, and preferred features in relation to any one of the aspects of the present invention detailed above may also be features, including optional, suitable and preferred features in relation to any other aspects of the invention (i.e. the product per se).

Particular Embodiments

In an embodiment, the process of the present invention comprises the steps of:
  i) preparing a sulfur-based polymer by reacting elemental sulfur with one or more organic crosslinking agents, wherein the organic crosslinking agent(s) comprises two or more carbon-carbon double bonds;
  ii) carbonising the sulfur-based polymer of step (i) in the presence of an inorganic base (e.g. KOH), an inorganic acid (e.g. H$_3$PO$_4$) or an inorganic salt (e.g. NaCl);
    wherein the mass ratio of sulfur-based polymer to inorganic base, inorganic acid or inorganic salt is between 5:1 and 1:5.

In another embodiment, the process of the present invention comprises the steps of:
  i) preparing a sulfur-based polymer by reacting elemental sulfur with one or more organic crosslinking agents, wherein the organic crosslinking agent(s) comprises two or more carbon-carbon double bonds;
  ii) carbonising the sulfur-based polymer of step (i) in the presence of an inorganic base (e.g. KOH);
    wherein the mass ratio of sulfur-based polymer to inorganic base is between 5:1 and 1:5 and the carbonisation of step (ii) is conducted at a temperature of between 650° C. and 850° C.

In another embodiment, the process of the present invention comprises the steps of:
  i) preparing a sulfur-based polymer by reacting elemental sulfur with one or more organic crosslinking agents, wherein the organic crosslinking agent(s) comprises two carbon-carbon double bonds;
  ii) carbonising the sulfur-based polymer of step (i) in the presence of an inorganic base (e.g. KOH) for at least 2 hours;
    wherein the mass ratio of sulfur-based polymer to inorganic base is between 3:1 and 1:3 and the carbonisation of step (ii) is conducted at a temperature of between 650° C. and 850° C.

In another embodiment, the process of the present invention comprises the steps of:
  i) preparing a sulfur-based polymer by reacting elemental sulfur with one or more organic crosslinking agents, wherein the organic crosslinking agent(s) comprises two carbon-carbon double bonds;
  ii) carbonising the sulfur-based polymer of step (i) in the presence of an inorganic base (e.g. KOH) for between 1 hour and 4 hours;
    wherein the mass ratio of sulfur-based polymer to inorganic base is between 3:1 and 1:3 and the carbonisation of step (ii) is conducted at a temperature of between 650° C. and 850° C.

In another embodiment, the process of the present invention comprises the steps of:
  i) preparing a sulfur-based polymer by reacting elemental sulfur with an organic crosslinking agent (e.g. dicyclopentadiene), wherein the organic crosslinking agent comprises two carbon-carbon double bonds and has a molecular weight of less than 300;
  ii) carbonising the sulfur-based polymer of step (i) in the presence of an inorganic base (e.g. KOH) for at least 2 hours;
    wherein the mass ratio of sulfur-based polymer to inorganic base is between 3:1 and 1:3 and the carbonisation of step (ii) is conducted at a temperature of between 650° C. and 850° C.

In another embodiment, the process of the present invention comprises the steps of:
  i) preparing a sulfur-based polymer by reacting elemental sulfur with an organic crosslinking agent (e.g. dicyclopentadiene) at a temperature of greater than or equal to 140° C., wherein the organic crosslinking agent comprises two carbon-carbon double bonds and has a molecular weight of less than 200;
  ii) carbonising the sulfur-based polymer of step (i) in the presence of an inorganic base (e.g. KOH) for at least 2 hours;
    wherein the mass ratio of sulfur-based polymer to inorganic base is between 3:1 and 1:3 and the carbonisation of step (ii) is conducted at a temperature of between 650° C. and 850° C.

In another embodiment, the process of the present invention comprises the steps of:
  i) preparing a sulfur-based polymer by reacting elemental sulfur with dicyclopentadiene (DCPD) at a temperature of greater than or equal to 140° C.;
  ii) carbonising the sulfur-based polymer of step (i) in the presence of an inorganic base (e.g. KOH) for at least 2 hours;
    wherein the mass ratio of sulfur-based polymer to inorganic base is 1:1 and the carbonisation of step (ii) is conducted at a temperature of between 700° C. and 800° C.

Applications

The process of the present invention provides access to the novel sulfur-doped carbonaceous porous materials that may be utilised in numerous applications, such as, for example, gas adsorption, separation and storage, mercury capture, gold capture and as catalysts (i.e. for oxygen reduction reactions) or catalytic supports.

Thus, in one aspect, there is provided the use of a sulfur-doped carbonaceous porous material, as defined herein, in gas adsorption.

In another aspect of the present invention, there is provided the use of a sulfur-doped carbonaceous porous material, as defined herein, in gas separation.

In yet another aspect of the present invention, there is provided the use of a sulfur-doped carbonaceous porous material, as defined herein, in gas storage.

As the materials of the present invention are porous, they are particularly well suited to storing and absorbing gas. It will be appreciated that the sulfur-doped carbonaceous porous materials of the present invention may therefore be used to store, absorb and/or separate any suitable gas. Furthermore, it will be understood that the gas storage/absorption capabilities of the sulfur-doped carbonaceous porous materials of the present invention, will vary according to the specific amount and nature of organic crosslinking agent used in step (i) of the present process.

Suitably, the gas to be stored, absorbed and/or separated is selected from methane, hydrogen or carbon dioxide. Most suitably, the gas to be stored, absorbed and/or separated is carbon dioxide.

In a further aspect of the present invention, there is provided the use of a sulfur-doped carbonaceous porous material, as defined herein, as a catalyst support. In an embodiment, there is provided the use of a sulfur-doped carbonaceous porous material, as defined herein, as a solid catalyst support.

As the materials of the present invention have an exceptionally high surface area, they are particularly well suited to acting as a supports for various catalysts. It will be appreciated that the sulfur-doped carbonaceous porous material of the present invention may be used as a support for any suitable catalyst. Suitably, the sulfur-doped carbonaceous porous material of the present invention may be used as a solid support for catalysts comprising precious/noble metals (i.e. palladium, platinum, gold and/or silver). More suitably, the sulfur-doped carbonaceous porous material of the present invention may be used as a solid support for catalytic and electro-catalytic processes.

Sulfur atoms are known to have an excellent affinity for certain elements such as, for example, toxic metals such as mercury or cadmium and precious/noble metals such as gold, silver, platinum, and palladium. Thus, given that the materials of the present invention have a high doping of sulfur atoms they are particularly well suited for use in extracting (capturing) mercury and/or precious/noble metals (e.g. gold, silver, platinum, and palladium) from various feedstocks. Suitable feedstocks from which mercury and/or precious/noble metal (gold, silver, platinum, and palladium) may be extracted include solutions and/or dispersions of mercury and/or the precious/noble metal.

Thus, in another aspect of the present invention, there is provided the use of a sulfur-doped carbonaceous porous material, as defined herein, in the capture of mercury.

In yet a further aspect of the present invention, there is provided the use of a sulfur-doped carbonaceous porous material, as defined herein, in the capture of precious/noble metals (e.g. gold, silver, platinum, and palladium).

In an embodiment, there is provided the use of a sulfur-doped carbonaceous porous material, as defined herein, in the capture of gold, platinum and/or palladium. Suitably, there is provided the use of a sulfur-doped carbonaceous porous material, as defined herein, in the capture of gold.

EXAMPLES

Description of Drawings

Embodiments of the invention will be described, by way of example only, with reference to the accompanying drawings, in which.

SULFUR-DOPED CARBONACEOUS POROUS MATERIAL NOMENCLATURE

Figure 1:
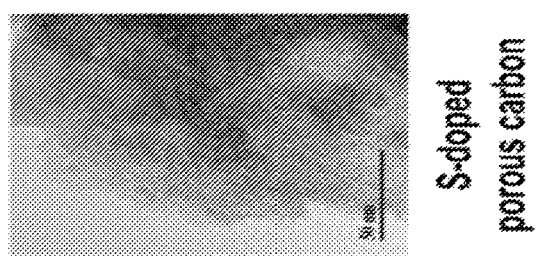
FIG. 1 shows the synthesis of the hypercrosslinked polymers and the subsequent carbonization method.
Figure 1:
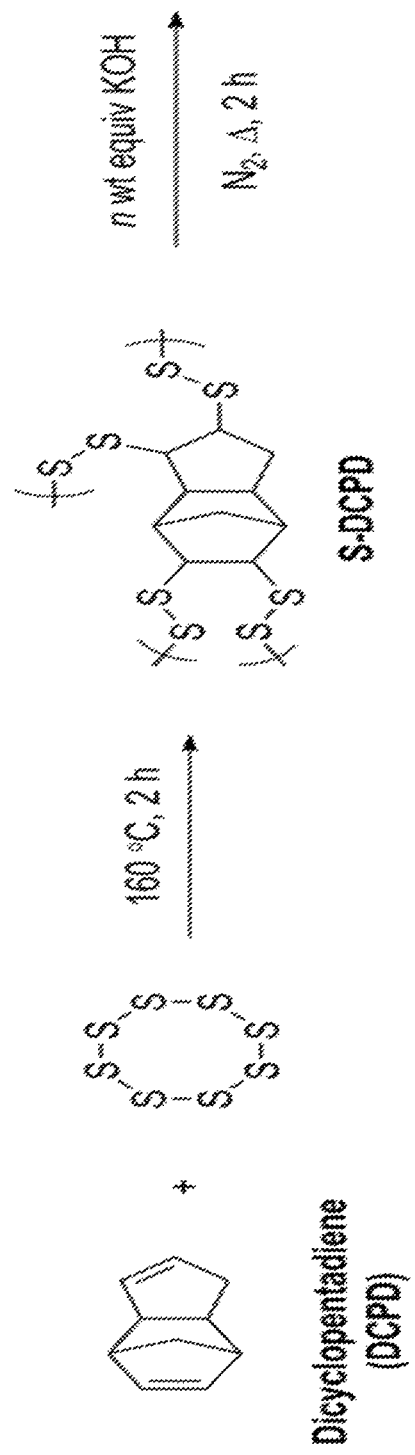

In the illustrative examples hereinbelow, the following nomenclature is used to denote each of the sulfur-doped carbonaceous porous materials prepared:

nB-S-[Crosslinker]-Δ wherein:
- n is the mass ratio of porosity enhancement agent (e.g. inorganic base) to sulfur-based polymer;
- B is the porosity enhancement agent (e.g. potassium hydroxide);
- S is sulfur;
- [Crosslinker] is the crosslinker used (e.g. [DCPD]=dicyclopentadiene)
- Δ is the temperature at which carbonisation is conducted.

For example, using the above labelling system, the carbonisation of a sulfur-based polymer (formed from the reaction between elemental sulfur and dicyclopentadiene) with a 1:1 mass ratio of KOH at 750° C. would be given the following label—1K-S-DCPD-750.

Materials

Dicyclopentadiene (DCPD) was purchased from Tokyo Chemicals Industry. Sulfur and potassium hydroxide were purchased from Sigma Aldrich. High purity nitrogen was purchased from BOC. All chemicals were used as received without any further purification. Distilled water was used in purifications.

Synthesis of S-DCPD

Polymerisations were carried out in open glass samples vials (12 or 40 mL volume) in aluminium heating blocks, with heating and stirring provided by electronic hotplates and magnetic stirrer bars. All reactions were begun by allowing the sulfur to fully melt, at 160° C., before adding the organic crosslinking agent directly. Sulfur:organic crosslinking agent mass ratios were varied, but total mass was typically between 5 and 20 g.

Using DCPD as the crosslinker, heating was maintained at 160° C. for 2 hours (the reaction vitrifies after typically ~20 minutes). The colour became increasingly dark during the polymerisation, resulting in a black solid product. Moulded objects were prepared by polymerising the crosslinker (DCPD) and sulfur together as normal in a stirred glass vial, to ensure homogeneous mixing, before transferring them into a silicone mould and curing in an oven at 140° C. for 12 hours. The point to transfer the reaction mixture from the stirred vial to the mould was taken as the point at which an aliquot of the reaction mixture, when removed on a spatula and allowed to cool to room temperature, would no longer visibly separate to clear organic monomer, and precipitated yellow sulfur powder, but instead remain as a homogeneous brown viscous liquid.

Synthesis of Directly Carbonised Materials (Comparative Examples)

In a typical procedure, S-DCPD (300 mg) was homogeneously ground using a pestle and mortar. The polymer was placed in a ceramic boat and inserted within a tube furnace. The furnace was purged with $N_2$ at room temperature for 30 min, heated to the specified temperature at a rate of 5° C. $min^{-1}$, held at the set temperature for the associated time, and finally cooled to room temperature. The material was used without further purification.

Synthesis of KOH Activated Carbonised Materials

In a typical procedure, S-DCPD (1.0 g) and the associated amount of KOH was homogeneously ground using a pestle and mortar. The mixture was placed in a ceramic boat and inserted within a tube furnace. The furnace was purged with $N_2$ at room temperature for 30 min, heated to the specified temperature at a rate of 5° C. $min^{-1}$, held at the set temperature for 2 h, and finally cooled to room temperature. The residue was washed thoroughly with DI water and 1 M HCl until the filtrate attained pH 7. The resultant carbons were dried under vacuum for 1 d at 70° C.

Mercury Uptake Studies

A stock solution of mercury was made by dissolving $HgCl_2$ (338 mg) in deionised water (250 mL) to produce a concentration of 1000 ppm, this was then used to prepare the test solutions of 20, 100, 500 and 750 ppm by serial dilutions. Activated charcoal (Sigma Aldrich, measured at 594 $m^2$ $g^{-1}$) and 1K-S-DCPD were coarsely ground and screened through a 45 mesh sieve to ensure particles no larger than 350 microns. 12 mL of each solution was decanted in to a series of glass vials along with either 15, 30 or 60 mg of 1K-S-DCPD or activated charcoal, the vials were then capped and placed on a roller for 1 hour at room temperature. After 1 hour, the vials were removed and the test solutions filtered into clean sample vials using a 0.22 μm filter and a polypropylene syringe. Samples were analysed by ICP-OES, conducted using an Agilent 5110. The data were fitted to a Langmuir isotherm, $q_A=(K.C_e.Q_{sat})/(1+K.C_e)$, where qA=mg adsorbate per g adsorbent (mg g$^{-1}$), K=adsorption parameter (L mg$^{-1}$), Ce=equilibrium concentration (mg L$^{-1}$) and $Q_{sat}$=maximum capacity (mg g$^{-1}$)

Gas Sorption

The porous properties of the networks were investigated by nitrogen adsorption and desorption at 77.3 K using an ASAP2420 volumetric adsorption analyser (Micrometrics Instrument Corporation). 1 bar $CO_2$ and $CH_4$ isotherms at 298 K and $H_2$ isotherms at 77.3 K were collected on a Micromeritics ASAP2020 and ASAP2050. 10 bar $CO_2$ and $CH_4$ isotherms at 298 K and $H_2$ isotherms at 77.3 K were collected using a Micromeritics ASAP2050. All samples were degassed at 100° C. for 15 h under vacuum (10$^{-5}$ bar) before analysis.

Pore Structure Analysis

Pore structure properties of the samples were determined via nitrogen adsorption and desorption at 77.3 K using a volumetric technique on an ASAP2420 adsorption analyser (Micromeritics Instrument Corporation). Before analysis, the samples were degassed at 100° C. for 15 h under vacuum (10$^{-5}$ bar).

Brunauer-Emmett-Teller (BET) surface area was obtained in the relative pressure (P/P$_0$) range of 0.05-0.20, and total pore volume ($V_t$) was determined from the amount of nitrogen adsorbed at P/P$_0$=ca. 0.99.

FE-SEM

High resolution imaging of the polymer morphology was achieved using a Hitachi S-4800 cold field emission scanning electron microscope (FE-SEM).

HR-TEM

High-resolution transmission electron microscopy (HR-TEM) was performed using a JEOL 2100FCS microscope, equipped with a Schottky field emission gun, operating at 200 kV. Bright field images were recorded in conventional TEM illumination mode. Chemical analyses were performed by energy dispersive x-ray spectroscopy using a windowless EDAX spectrometer.

TEM specimens were produced by ultrasonically dispersing powder in analytical grade methanol, the suspension was then dropped onto copper mesh grids with holey carbon support films and allowed to dry.

Elemental Analysis

CHN elemental analysis was conducted on a Thermo FlashEA 1112.

PXRD

Powder X-ray diffraction (PXRD) data were collected in transmission mode on loose powder samples held on thin Mylar film in Stainless steel well plates on a Panalytical X'Pert PRO MPD equipped with an high throughput screening (HTS) XYZ stage, X-ray focusing mirror, ½ degree divergence slit, 0.04 degree soller slits, 4 mm beam mask and PIXcel detector, using Cu Kα radiation. Data were measured over the range 5-50° 2θ in 0.013° steps over 60 minutes.

Design and Porosity of S-Doped Carbons

Figure 6:
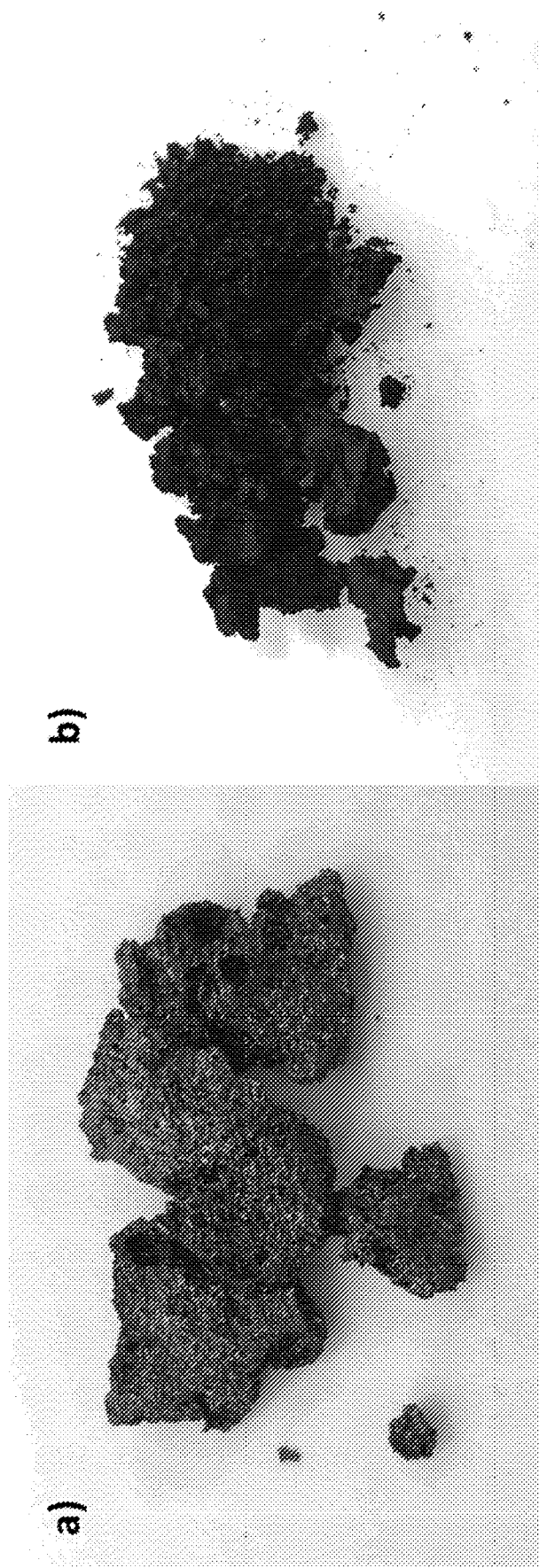
FIG. 6 shows photographs of a) directly carbonized S-DCPD resulting in a large grey metallic monolith and b) KOH activated S-DCPD carbon black powder.

S-DCPD was initially carbonised under a flow of nitrogen at 750° C. for 1 h as a direct comparison with the previously reported carbonised inverse vulcansed polymer,[19] and the product was denoted as S-DCPD-750-1. This material became microporous with a SA$_{BET}$ of 403 m$^2$ g$^{-1}$. A yellow powder appeared in the tube furnace exhaust due to the leeching of elemental sulfur, and the resultant material was a shiny grey/black monolith (FIG. 6).

Figure 7:
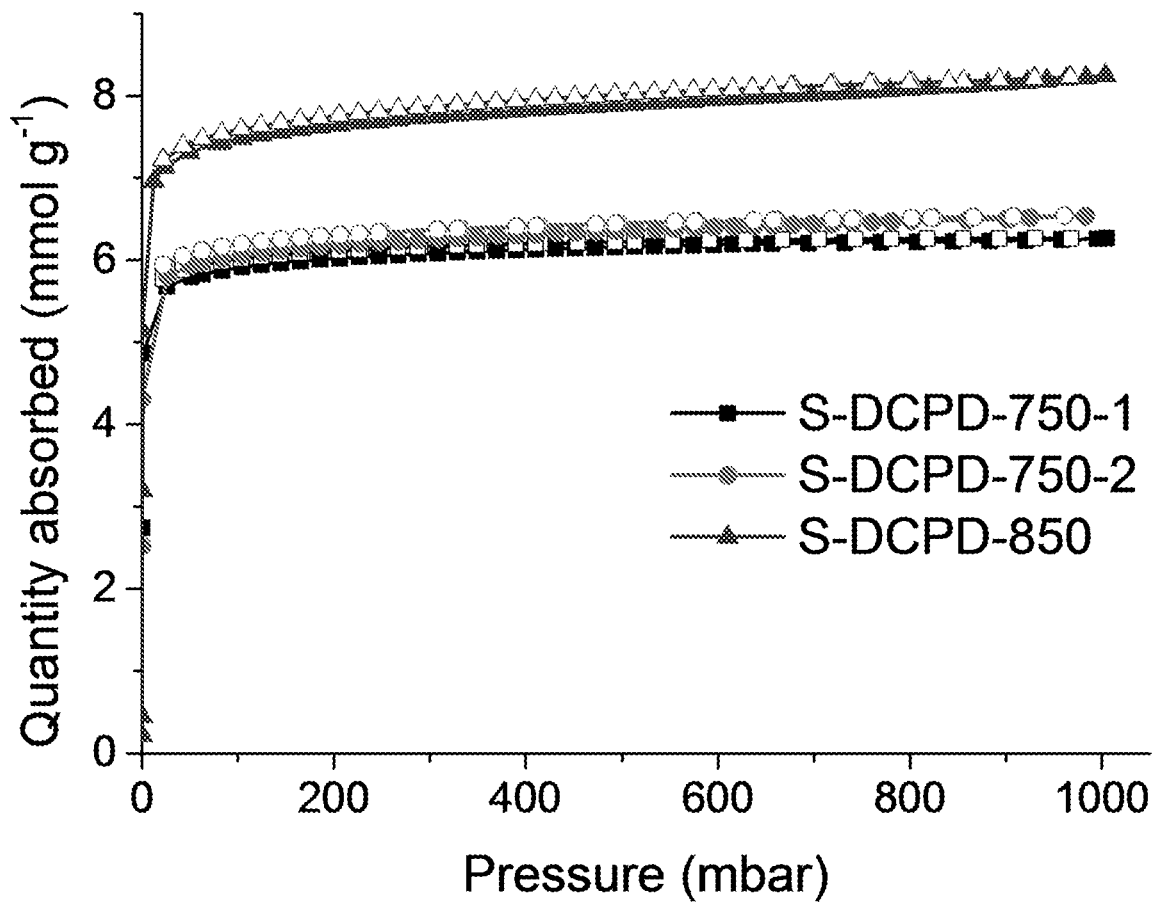
FIG. 7 shows the nitrogen adsorption-desorption isotherms of directly carbonized S-DCPD at 77.3 K (the adsorption and desorption branches are labelled with filled and empty symbols, respectively).

With the aim of increasing the surface areas, S-DCPD was further carbonised for an extended time of 2 h and another sample was carbonised at a higher temperature, 850° C., for 2 h (S-DCPD-750-2 and S-DCPD-850, respectively). The nitrogen sorption isotherms for S-DCPD-750-1 and S-DCPD-750-2 were very similar (FIG. 7); both exhibited Type Ia behaviour where most of the nitrogen uptake occurs at P/P$_0$<0.02, indicating narrow micropores (FIG. 8), resulting in a SA$_{BET}$ of 415 m$^2$ g$^{-1}$ for S-DCPD-750-2.

S-DCPD-850 also showed a Type Ia isotherm, but the somewhat larger gas uptake at the microporous region resulted in a higher SA$_{BET}$ of 511 m$^2$ g$^{-1}$. These surface areas are comparable to previously reported carbonised inverse vulcansed polymers.[19]

Figure 2:
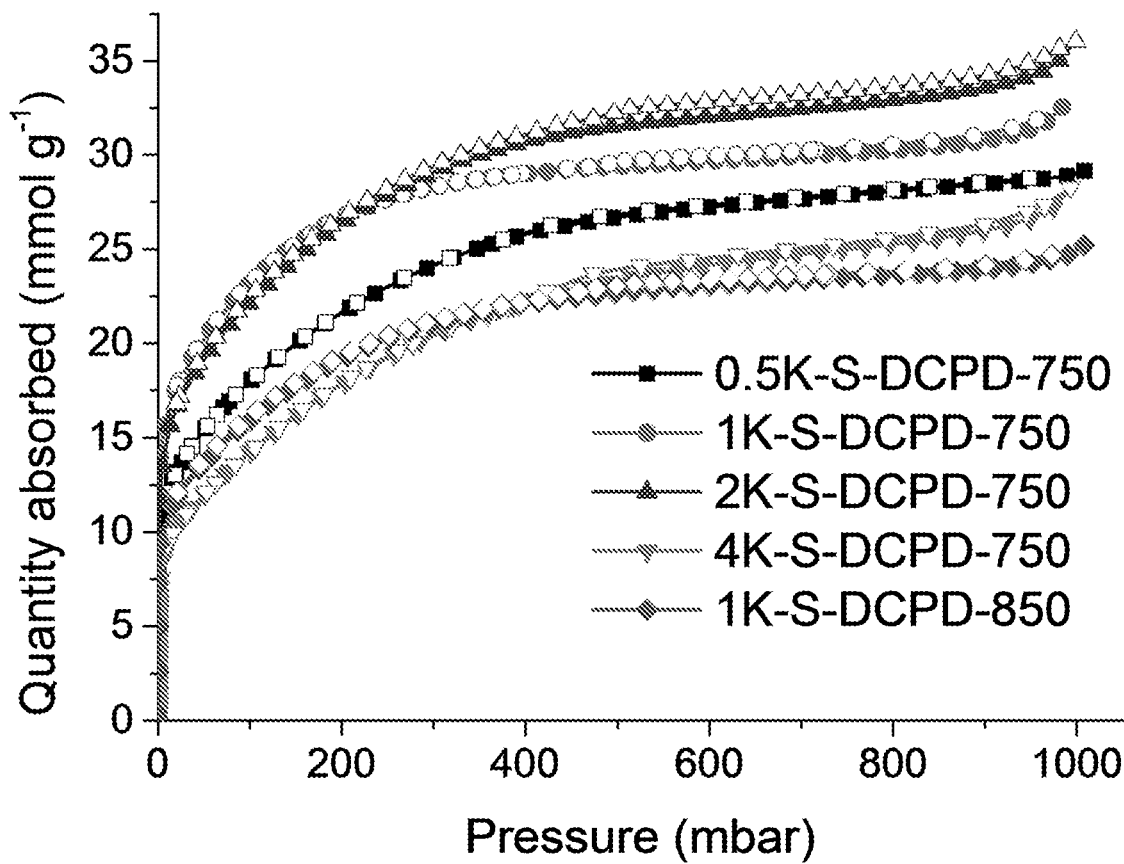
FIG. 2 shows the nitrogen adsorption-desorption isotherms of KOH activated S-DCPD carbons at 77.3 K (the adsorption and desorption branches are labelled with filled and empty symbols, respectively).

We next moved to a different carbonisation approach with the aid of KOH as a chemical activating agent to target higher surface area S-doped carbons. S-DCPD was synthesised and thoroughly mixed with varying amounts of KOH before being carbonised under a nitrogen flow for 2 h (FIG. 1). The carbons are referred to as nK-S-DCPD-Δ where n is the mass ratio of KOH to S-DCPD and Δ signifies the carbonisation temperature. The nitrogen sorption isotherms of the KOH-activated carbonised S-DCPD showed high levels of microporosity in all samples (FIG. 2). The physical properties of these carbons and their precursors are summarized in Table 1.

Figure 8:
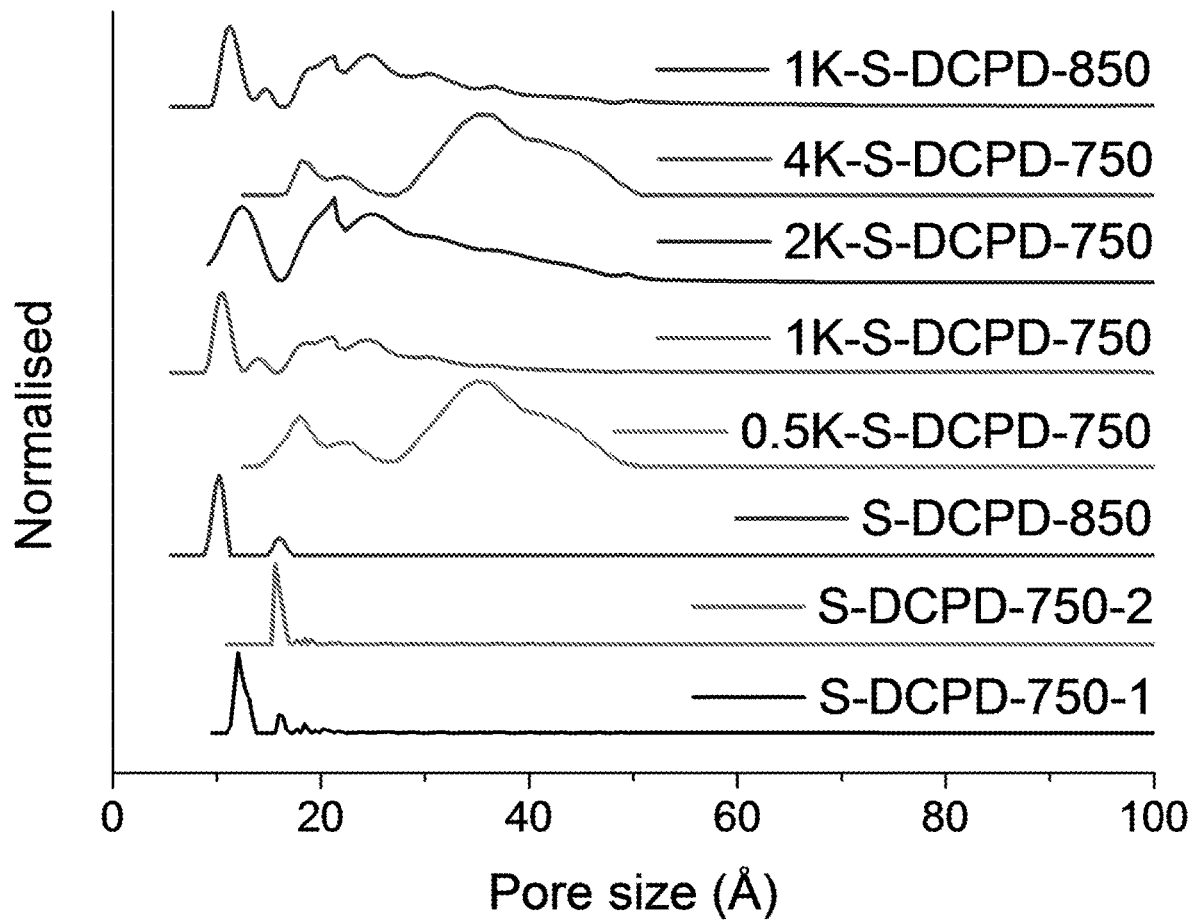
FIG. 8 shows the pore size distributions of carbonised S-DCPD calculated by non-local density functional theory (NL-DFT).

0.5K-S-DCPD-750 showed a Type Ib isotherm indicating high levels of microporosity with pore size distributions over a broader range compared with the directly carbonised samples (FIG. 8). As the KOH to S-DCPD ratio was increased to 1:1 in 1K-S-DCPD-750, the nitrogen sorption increases, especially in the P/P$_0$<0.02 microporous region, resulting in a higher micropore volume (0.80 versus 0.51 cm$^3$ g$^{-1}$) and an increase in SA$_{BET}$ (2216 m$^2$ g$^{-1}$ versus 1792 m$^2$ g$^{-1}$). Further increases in the KOH quantity in 2K-S-DCPD-750 and 4K-S-DCPD-750 resulted in some Type IVa character, where a hysteresis loop gradually appeared at P/P$_0$=0.5 indicative of the development of mesopores. The SA$_{BET}$ values for these hierarchically-porous materials were 2197 and 1520 m$^2$ g$^{-1}$, respectively. The micropore percentage fell from 73% in 1K-S-DCPD-750 to 56% in 2K-S-DCPD-750 and 28% in 4K-S-DCPD-750, perhaps because of an oversaturation of the KOH activating agent causing micropore collapse. Since S-DCPD contains 50 wt % sulfur, smaller quantities of KOH activating agent are required compared with conventional carbonisations, where the precursor contains a much higher carbon content.[23]

Higher carbonisation temperatures (850° C.) were also tested with 1K-S-DCPD-850 since it is known that higher surface areas can be achieved with temperature optimisation,[1] but the resulting carbon yielded a Type Ib isotherm with a SA$_{BET}$ of 1599 m$^2$ g$^{-1}$. The carbonised S-DCPD materials retain a significant amount of their parent sulfur heteroatom in their structure—up to 18.16 wt %—showing that incorporation of sulfur into the porous carbon is possible when using inverse vulcansed polymers as a carbonisation precursor (Table 2). The SA$_{BET}$ of 2216 m$^2$ g$^{-1}$ for 1K-S-DCPD-750 outperforms other microporous S-doped carbons,[24] including carbonisation precursors that were inherently porous and more costly.[25]

TABLE 1

Physical properties, $H_2$, $CO_2$, and $CH_4$ uptake of KOH activated S-DCPD carbons.

| Sample | Surface area ($m^2\,g^{-1}$) BET method | Surface area ($m^2\,g^{-1}$) Langmuir method | Pore volume[a] ($cm^3\,g^{-1}$) Micropore | Pore volume[a] ($cm^3\,g^{-1}$) Total pore[b] | Gas uptake $CO_2$[c] ($mmol\,g^{-1}$) | Gas uptake $CH_4$[d] ($mmol\,g^{-1}$) | Gas uptake $H_2$[e] (wt %) |
|---|---|---|---|---|---|---|---|
| 0.5KS-DCPD-750 | 1792 | 2379 | 0.51 | 1.00 | 2.01 | 1.07 | 1.99 |
| 1KS-DCPD-750 | 2216 | 2976 | 0.80 | 1.09 | 2.20 | 1.03 | 2.09 |
| 2KS-DCPD-750 | 2197 | 3015 | 0.68 | 1.21 | 1.79 | 0.58 | 1.88 |
| 4KS-DCPD-750 | 1520 | 1995 | 0.26 | 0.92 | 1.29 | 0.50 | 1.40 |
| 1KS-DCPD-850 | 1599 | 2226 | 0.48 | 0.84 | 1.31 | 0.57 | 1.41 |

[a]Calculated by single point pore volume.
[b]Total pore volume at $P/P_0 = 0.99$.
[c]$CO_2$ uptake at 298K and 1 bar.
[d]$CH_4$ uptake at 298K and 1 bar.
[e]$H_2$ uptake at 77K and 1 bar.

TABLE 2

Carbonisation yields and CHNS elemental analysis of S-doped porous carbon products.

| Sample | Yield (%) | C | H | S |
|---|---|---|---|---|
| S-DCPD-750-1 | 36 | 75.85 | 0.66 | 18.16 |
| S-DCPD-750-2 | 35 | 77.25 | 0.63 | 17.67 |
| S-DCPD-850 | 32 | 81.86 | 0.50 | 11.89 |
| 0.5K-S-DCPD-750 | 23 | 74.91 | 0.35 | 13.54 |
| 1K-S-DCPD-750 | 34 | 74.14 | 0.55 | 13.27 |
| 2K-S-DCPD-750 | 14 | 78.37 | 0.95 | 12.77 |
| 4K-S-DCPD-750 | 16 | 77.98 | 0.55 | 12.73 |
| 1K-S-DCPD-850 | 34 | 69.40 | 0.87 | 9.55 |

Characterisation of Carbons

Figure 3:
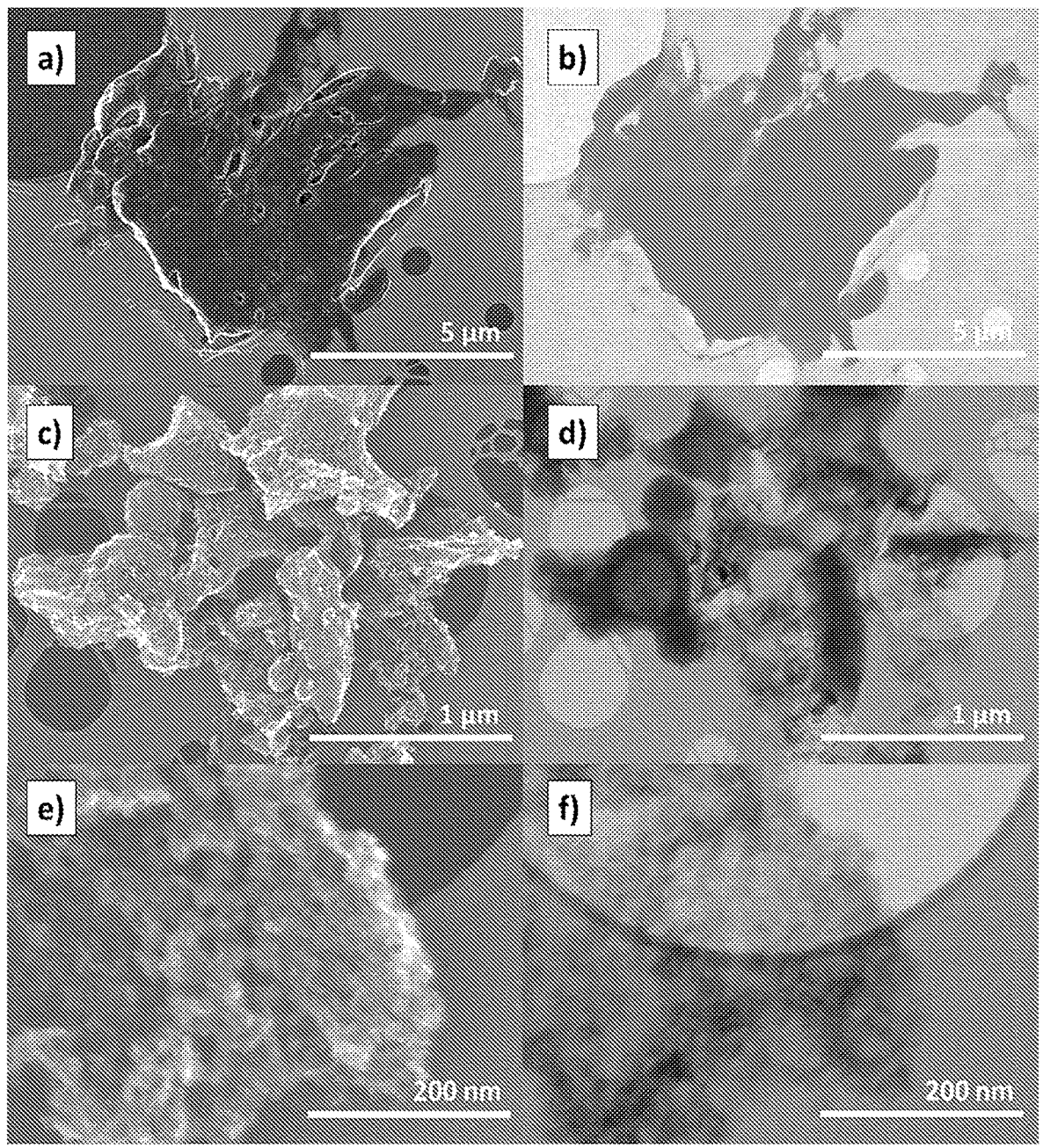
FIG. 3 shows the FE-SEM images of a) S-DCPD-850 and c) 1K-S-DCPD-750. TEM images of b) S-DCPD-850 and d) 1K-S-DCPD-750. Higher e) FE-SEM and f) TEM magnification of 1K-S-DCPD-750.

Field emission scanning electron microscopy (FE-SEM) and transmission electron microscopy (TEM) was used to study the morphology of carbonised S-DCPD products (FIG. 3). The shiny, monolithic structure from directly carbonising S-DCPD in S-DCPD-850 is shown in FIG. 3a. The observed structure was smooth with few signs of pores on the surface. TEM of the sample also backed up this observation since the white spots that are typically indicative of pores were not apparent (FIG. 3b).

The KOH-activated carbonised product, 1K-S-DCPD-750, was a black powder (FIG. 6b) and its rough, particulate surface was apparent under FE-SEM (FIG. 3c & e). TEM of the porous carbon indicated high porosity, and a lower density was structure observed (FIG. 3d & f).

Figure 9:
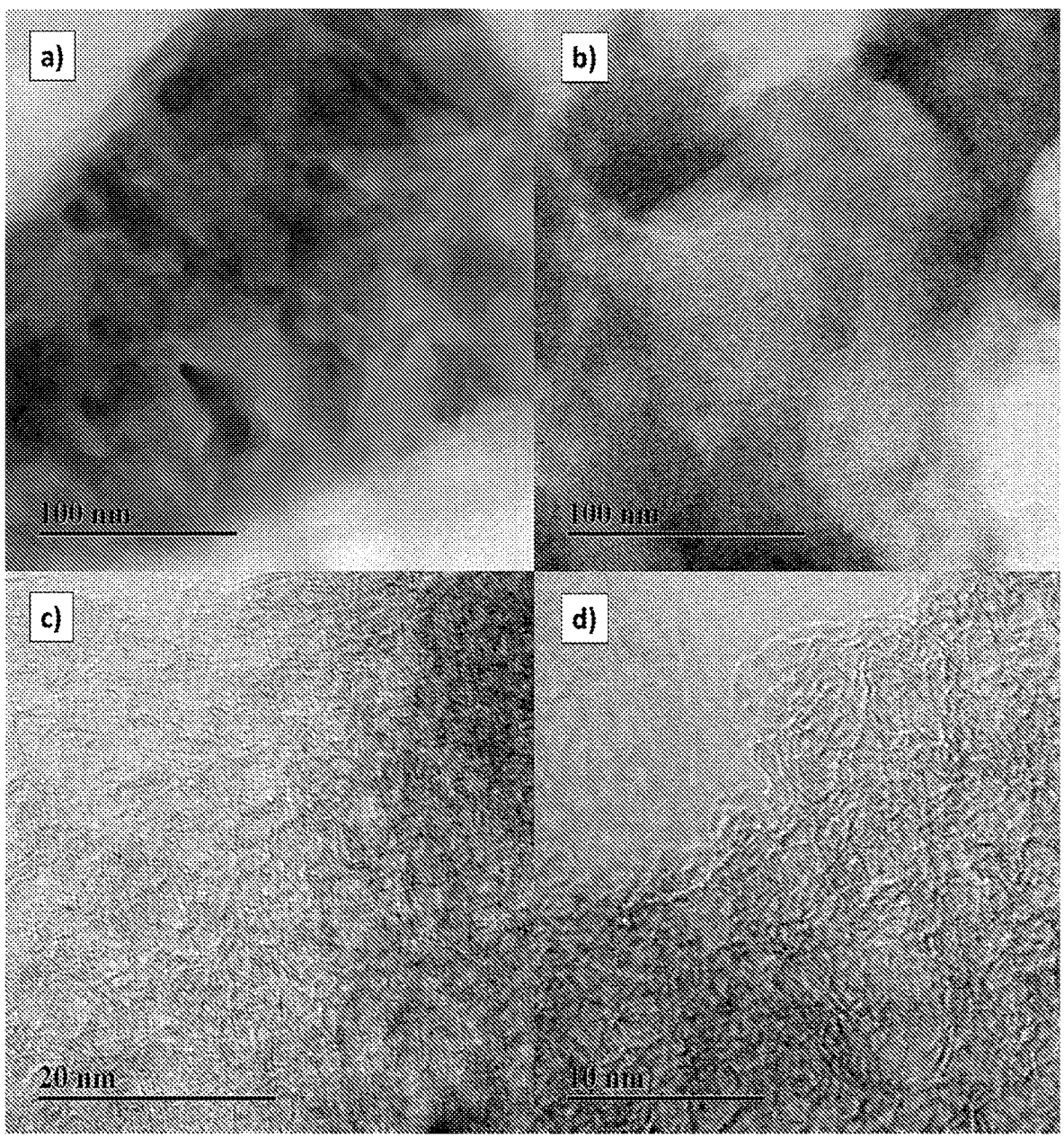
FIG. 9 shows the HR-TEM images of a) S-DCPD-850 and b) 1K-S-DCPD-750 with higher resolution images of 1K S-DCPD-750 at c) 20 nm and d) 10 nm scale.

High-resolution transmission electron microscopy (HR-TEM) was also used to examine both types of products and was found that the KOH-activated sample resulted in a more fibrous network due to its greater porosity (FIG. 9).

The morphology of the KOH-activated sample was also observed to be more homogeneous when scanning across the material compared to the directly carbonised sample, which can be advantageous.

Figure 10:
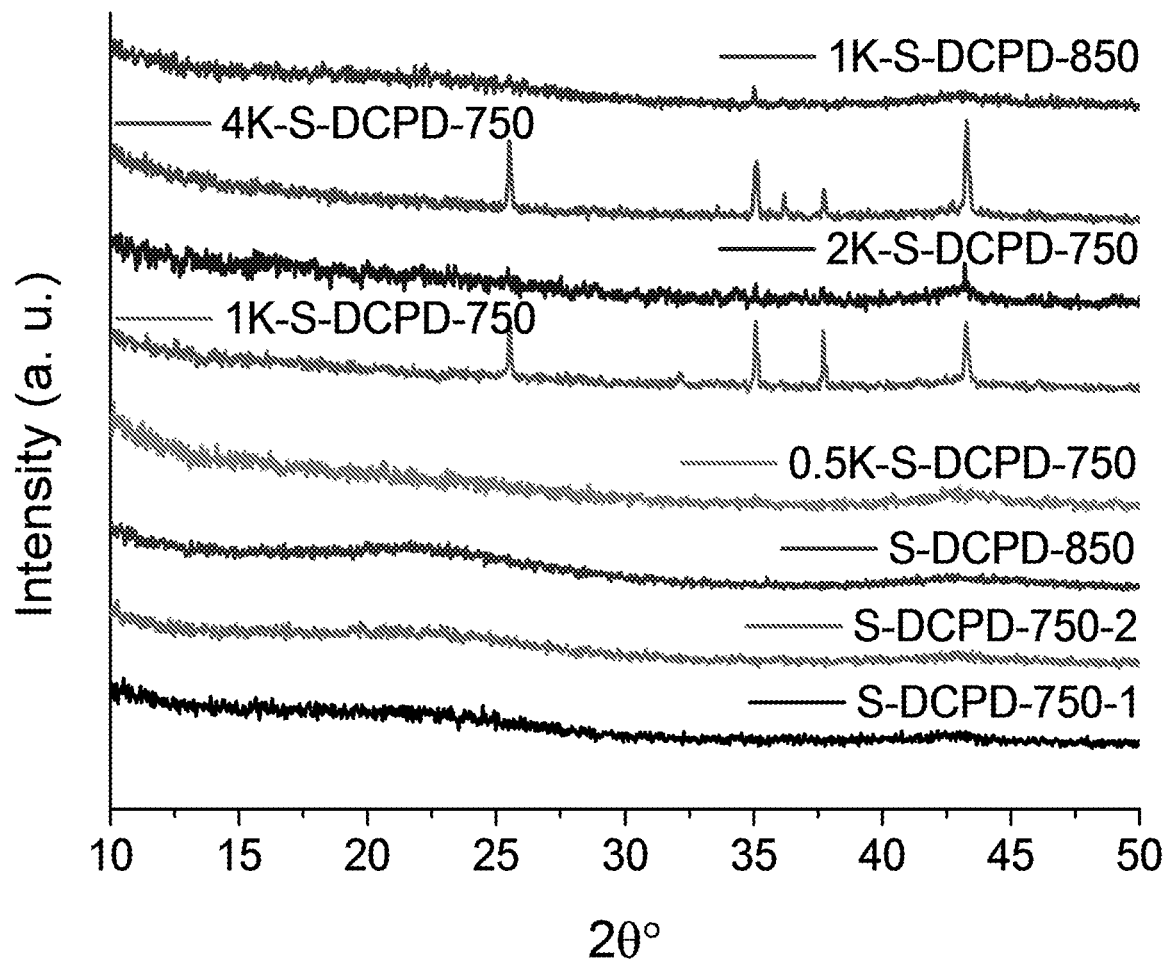
FIG. 10 shows the PXRD patterns of carbonized S-DCPD samples. Samples 1K-S-DCPD-750 and 4K-S-DCPD-750 contain additional alumina peaks associated from the ceramic boat and/or use of pestle and mortar.
Figure 11:
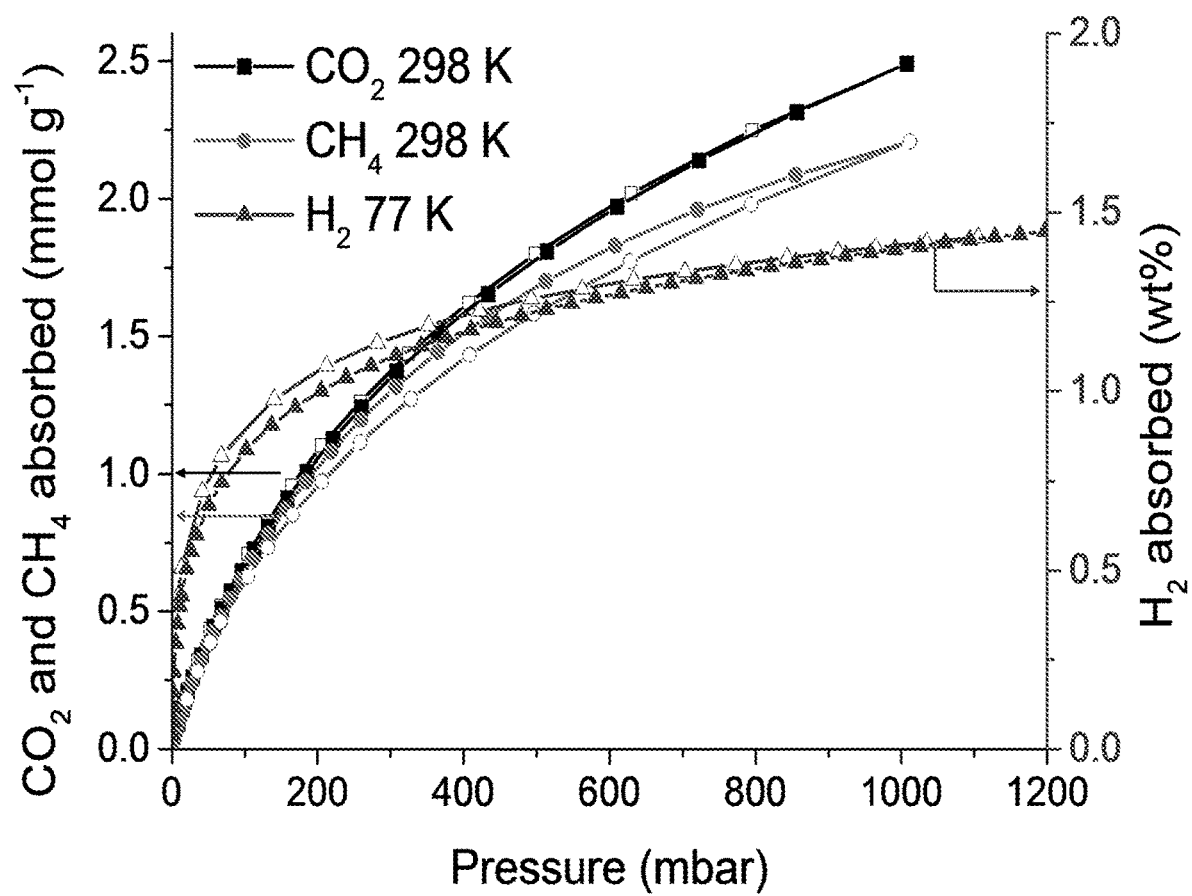
FIG. 11 shows the $CO_2$ and $CH_4$ sorption isotherms at 298 K and H2 sorption isotherms at 77 K of S-DCPD-850 over a pressure range of 0-10 bar.

Powder X-ray diffraction patterns of the carbonised products showed two broad characteristic peaks located at 25 and 43° (FIG. 10), corresponding to the (002) and (100) planes of hexagonal graphite, respectively, revealing the presence of an amorphous structure and a low degree of graphitisation.[26]

$CO_2$, $CH_4$ and $H_2$ Storage

Figure 4:
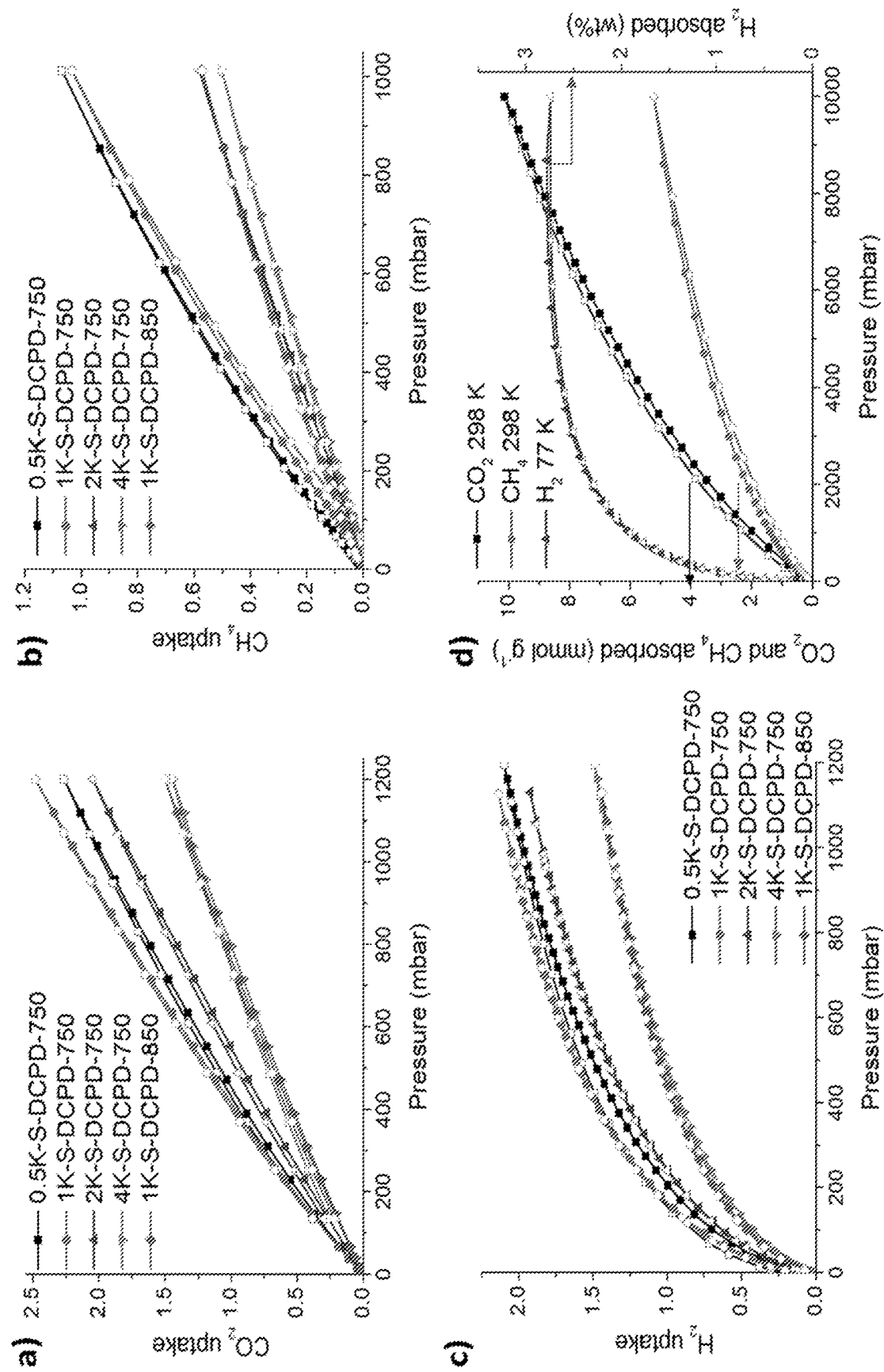
FIG. 4 shows a) $CO_2$ sorption isotherms at 298 K over pressure range 0-1 bar. b) $CH_4$ sorption isotherms at 298 K over pressure range 0-1 bar. c) H2 sorption isotherms at 77 K over pressure range 0-1 bar. d) $CO_2$ and $CH_4$ sorption isotherms at 298 K and H2 sorption isotherms at 77 K of 1K-S-DCPD-750 over pressure range 0 10 bar.

The affinities of the S-DCPD carbons towards small gas sorption ($CO_2$, $CH_4$, and $H_2$) were studied (FIG. 4).

The $CO_2$ uptakes for the KOH-activated materials were tested at room temperature (ca. 298 K) with the full isotherms shown in FIG. 4a. Table 1 summarizes the amount of $CO_2$ absorbed by each material at a pressure of 1 bar. The $CO_2$ uptake was roughly proportional to the surface area of each material, with a $CO_2$ uptake of up to 2.20 mmol $g^{-1}$ for 1K-S-DCPD-750, outperforming recent reports of sulfur-containing microporous polymers,[20] previous carbonised inverse-vulcansed polymers,[19] sulfur-containing hyper-crosslinked microporous polymers,[27] and microporous networks COF-6,[28] CMP-1,[29] and highly porous PAF-1.[30]

The $CH_4$ sorption behaviour was also tested at 298 K and 1 bar with an uptake of up to 1.07 mmol $g^{-1}$ for 0.5KS-DCPD-750 (FIG. 4b).

$H_2$ uptakes tested at 77 K and 1 bar were high with all KOH-activated samples, with an uptake of 2.09 wt % observed from 1K-S-DCPD-750 (FIG. 4c). The large uptakes are due to $H_2$ being purely attracted to a large surface via physisorption as a result of weak van der Waals interactions.

The $H_2$ uptake is more than three times larger than the previously reported carbonised inverse vulcansed polymers; this a dramatic improvement for this cheap synthetic method,[19] although more striking results were found at higher gas pressures, as discussed below.

The absorption of small gases were also evaluated at pressures of up to 10 bar for the optimised sample, 1K-S-DCPD-750 (FIG. 4d). This material adsorbed up to 10.1 mmol $g^{-1}$ of $CO_2$ at 298 K with no sign of saturation, matching and outperforming more costly materials such as carbonised polyacrylonitrile AC-3000,[31] mesoporous silica templated carbon IBN-9,[32] and directly carbonised MOF-74 and MIL-53.[33]

1K-S-DCPD-750 adsorbs 2.74 wt % H2 at 77 K and 10 bar, outperforming industrial BPL activated carbon,[28] and exceeding porous carbons 12ACA-800 made from carbon aerogel via subcritical drying,[34] AC-C4 (activated at very high temperatures with further activation using $CO_2$ gas),[35] and even porous carbons measured at high pressures of over 60 bar.[36]

Mercury Capture Studies

The sulfur-doping in the structure of these microporous carbons may have further benefits, such as providing anchor sites for metal catalysts. The combination of high surfaces areas, hierarchical porosity, and high sulfur loading is also very attractive for the removal of trace heavy metals from water. Mercury pollution from industrial wastewater is a significant global health concern because of its relatively high solubility in water and tendency to bioaccumulate and cause severe toxic effects.[37]

Figure 5:
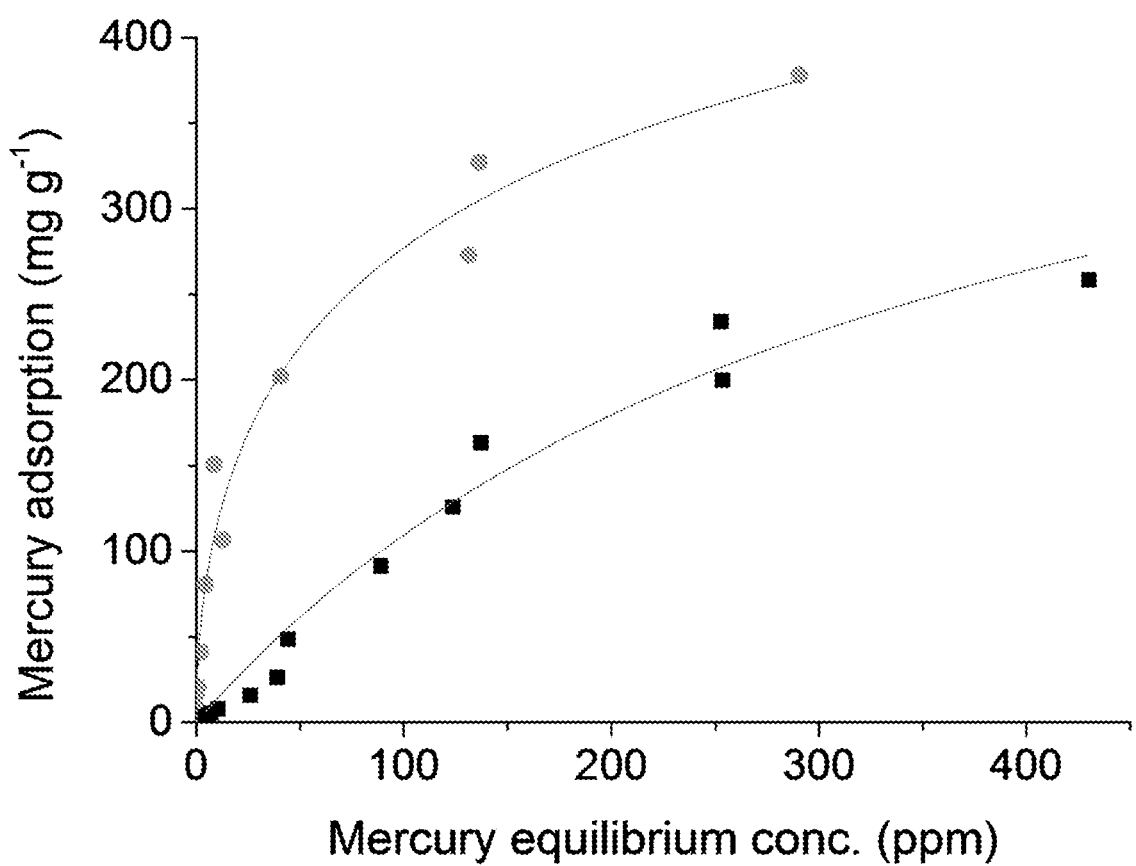
FIG. 5 shows the adsorption isotherm of mercury (as aqueous $HgCl_2$) into samples of carbonized sulfur polymer (orange circles) and conventional activated carbon (black squares), with Langmuir isotherm fitting shown as dashed red and black lines.

Sulfur is known to have a high affinity for mercury, and therefore 1K-S-DCPD-750 was tested for the capture of $HgCl_2$ from water (FIG. 5). 1K-S-DCPD-750 showed a greatly enhanced uptake of mercury in comparison to activated carbon, especially at low mercury concentrations. Activated carbons are frequently used for the adsorption of mercury from wastewater, and they generally show maximum Hg uptakes in the ~10-500 mg $g^{-1}$ range.[38]

At an equilibrium Hg concentration of ~10 ppm, 1K-S-DCPD-750 absorbed over 15 times more Hg than the activated carbon control (151 mg $g^{-1}$ versus 7.8 mg $g^{-1}$). Fitting these data to a Langmuir isotherm also indicated a higher saturation capacity for the sulfur loaded material (850 mg $g^{-1}$ vs. 498 mg $g^{-1}$) and adsorption parameters that were over 20 times higher (0.058 L $mg^{-1}$ vs. 0.0028 L $mg^{-1}$). Absorption of mercury at low concentrations (<1 mg $g^{-1}$) has particular practical relevance. For example, the Environmental Protection Agency has set a maximum contaminant level goal for mercury of 0.002 mg/L, or $1\times10^{-6}$ mg/g.[39]

Capture of Other Metals 100 ppm solutions (50 ml) of chromium, cobalt, copper, manganese, iron, nickel and mercury were made up from stock solutions respective metal salts (either chloride or nitrate forms) and de-ionised water. Activated charcoal and 1K-S-DCPD-750 were coarsely ground and screened through a 45 Mesh sieve to ensure that all tests would contain particles no larger than 350 microns. 15 ml plastic vials were loaded with 30 mg of either 1K-S-DCPD-750 or activated charcoal and 12 ml of the chosen metal solution, the tubes were then capped and placed on a roller for 1 hour at room temperature. Multiple metals were tested at a time by conducting tests in parallel. After 1 hour, the vials were removed and stood in a rack to allow the particulates to settle, whilst a 1 ml aliquot was removed for analysis. The samples were diluted by a factor of 10 by adding the 1 ml aliquots each to a vial containing 9 ml of de-ionised water. Samples were analysed along with a water blank and 100 ppm control samples of each metal using the same calibration method on the ICP-OES, with the data being corrected post collection. ICP-OES analysis was conducted using an Agilent 5110.

Figure 12:
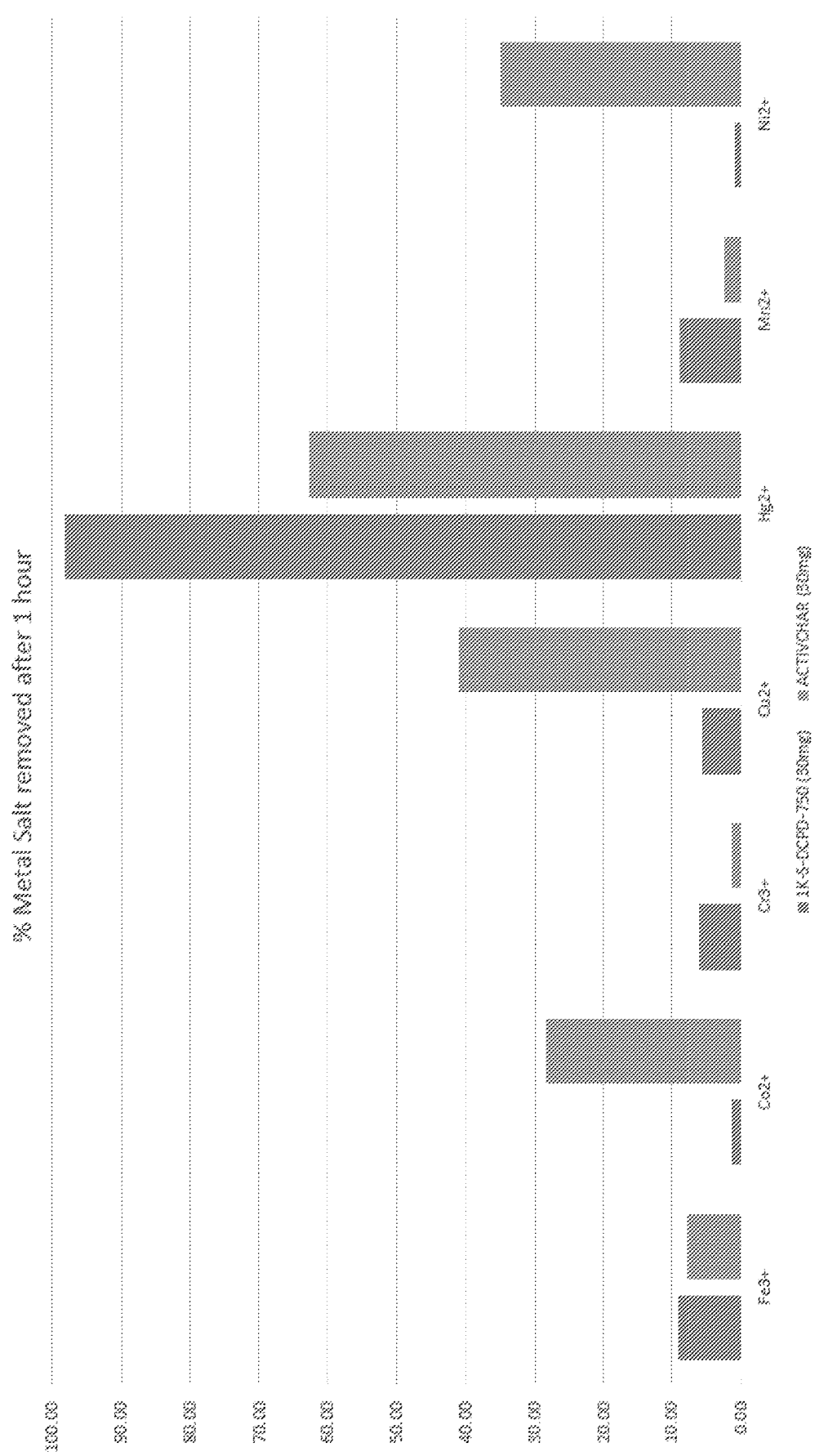
FIG. 12 shows the uptake of various metal ions from deionised water using 1K-S-DCPD-750 and activated charcoal.

Results from the application of the above described method are depicted in FIG. 12.

Capture of Gold

A 1,000 ppm gold solution (250 ml) was made up from a stock solution of Chloroauric acid ($HAuCl_4$) and deionised water, with the pH adjusted to 3-4 with the addition of Hydrochloric acid. Activated charcoal and 1K-S-DCPD-750 were coarsely ground and screened through a 45 Mesh sieve to ensure that all tests would contain particles no larger than 350 microns. 15 ml plastic vials were loaded with 5, 10, 20, 40 and 80 mg of either 1K-S-DCPD-750 or activated charcoal and 12 ml of the gold solution, the tubes were then capped and placed on a roller for 1 hour at room temperature. After 1 hour, the vials were removed and stood in a rack to allow the particulates to settle, whilst a 1 ml aliquot was removed for analysis. The samples were diluted by a factor of 10 by adding the 1 ml aliquots each to a vial containing 9 ml of de-ionised water. Samples were analysed along with a water blank and a 1,000 ppm control sample using the same calibration method on the ICP-OES, with the data being corrected post collection. ICP-OES analysis was conducted using an Agilent 5110.

Figure 13:
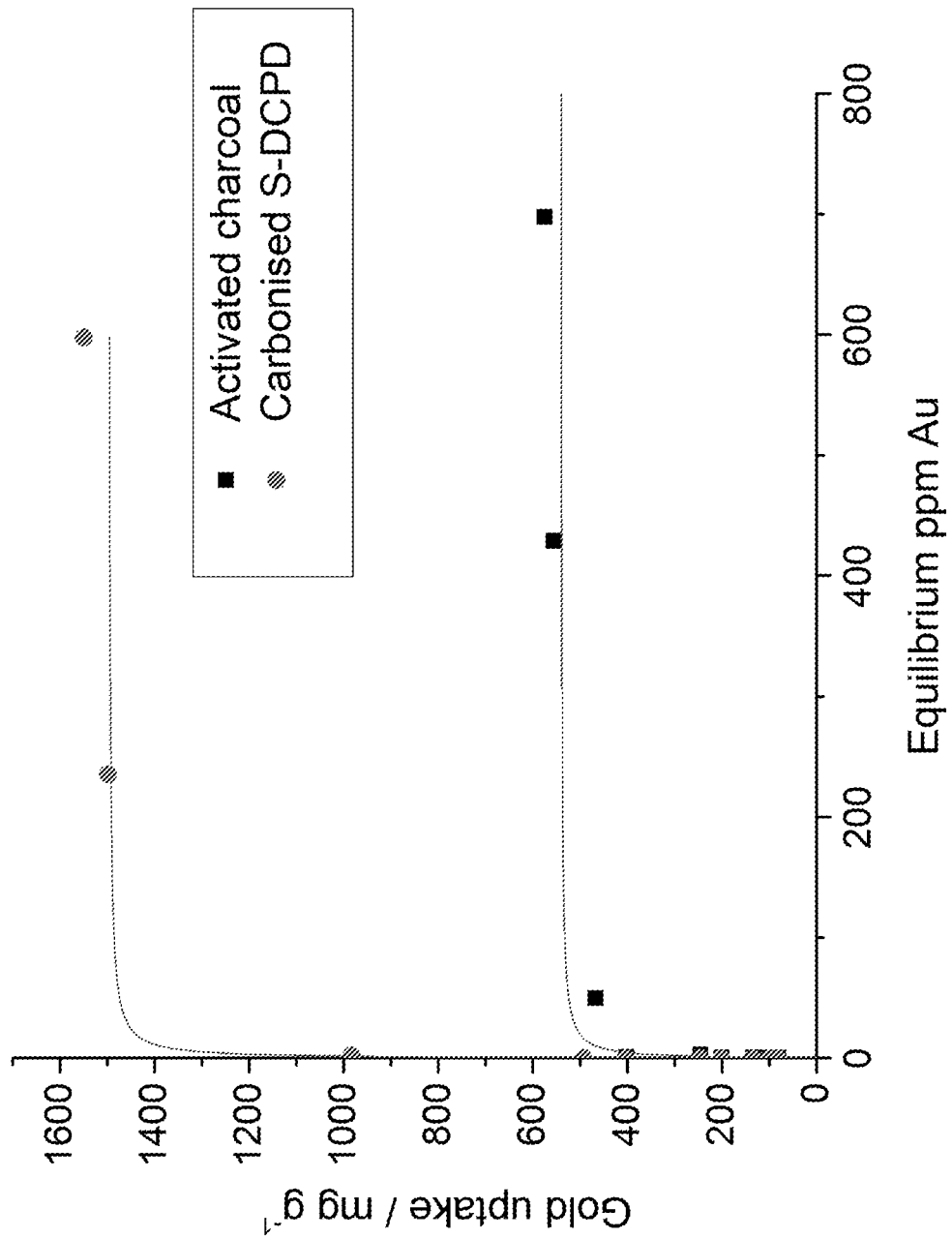
FIG. 13 shows the capture of gold from deionised water using 1K-S-DCPD-750 and activated charcoal.

Results from the application of the above described method are depicted in FIG. 13.

While specific embodiments of the invention have been described herein for the purpose of reference and illustration, various modifications will be apparent to a person skilled in the art without departing from the scope of the invention as defined by the appended claims.

REFERENCES

1. J.-S. M. Lee, M. E. Briggs, T. Hasell and A. I. Cooper, *Adv. Mater.*, 2016, 28, 9804-9810.
2. M. B. Rao and S. Sircar, *J. Membr. Sci.*, 1993, 85, 253-264.
3. Y. Yang, K. Chiang and N. Burke, *Catal. Today*, 2011, 178, 197-205.
4. J.-S. M. Lee, T.-H. Wu, B. M. Alston, M. E. Briggs, T. Hasell, C.-C. Hu and A. I. Cooper, *J. Mater. Chem. A*, 2016, 4, 7665-7673.
5. G. Li, J. Sun, W. Hou, S. Jiang, Y. Huang and J. Geng, *Nat. Comm.*, 2016, 7, 10601.
6. A. Stein, Z. Wang and M. A. Fierke, *Adv. Mater.*, 2009, 21, 265-293.
7. W. Kicinski, M. Szala and M. Bystrzejewski, *Carbon*, 2014, 68, 1-32.
8. D.-W. Wang, Q. Zeng, G. Zhou, L. Yin, F. Li, H.-M. Cheng, I. R. Gentle and G. Q. M. Lu, *J. Mater. Chem. A*, 2013, 1, 9382-9394.
9. J. J. Griebel, R. S. Glass, K. Char and J. Pyun, *Prog. Polym. Sci.*, 2016, 58, 90-125.
10. W. J. Chung, J. J. Griebel, E. T. Kim, H. Yoon, A. G. Simmonds, H. J. Ji, P. T. Dirlam, R. S. Glass, J. J. Wie, N. A. Nguyen, B. W. Guralnick, J. Park, A. Somogyi, P. Theato, M. E. Mackay, Y.-E. Sung, K. Char and J. Pyun, *Nature Chem.*, 2013, 5, 518-524.
11. M. Arslan, B. Kiskan and Y. Yagci, *Macromolecules*, 2016, 49, 767-773.
12. M. J. H. Worthington, R. L. Kucera and J. M. Chalker, *Green Chem.*, 2017.
13. D. A. Boyd, *Angew. Chem., Int. Ed.*, 2016, 55, 1548615502.
14. J. J. Griebel, S. Namnabat, E. T. Kim, R. Himmelhuber, D. H. Moronta, W. J. Chung, A. G. Simmonds, K. J. Kim, J. van der Laan, N. A. Nguyen, E. L. Dereniak, M. E. Mackay, K. Char, R. S. Glass, R. A. Norwood and J. Pyun, *Adv. Mater.*, 2014, 26, 3014-3018.
15. A. G. Simmonds, J. J. Griebel, J. Park, K. R. Kim, W. J. Chung, V. P. Oleshko, J. Kim, E. T. Kim, R. S. Glass, C. L. Soles, Y. E. Sung, K. Char and J. Pyun, *Acs Macro Letters*, 2014, 3, 229-232.
16. M. P. Crockett, A. M. Evans, M. J. H. Worthington, I. S. Albuquerque, A. D. Slattery, C. T. Gibson, J. A. Campbell, D. A. Lewis, G. J. L. Bernardes and J. M. Chalker, *Angew. Chem., Int. Ed.*, 2016, 55, 1714-1718.
17. M. W. Thielke, L. A. Bultema, D. D. Brauer, B. Richter, M. Fischer and P. Theato, *Polymers*, 2016, 8.
18. T. Hasell, D. J. Parker, H. A. Jones, T. McAllister and S. M. Howdle, *Chem. Commun.* (Cambridge, U. K.), 2016, 52, 5383-5386.
19. J. C. Bear, J. D. McGettrick, I. P. Parkin, C. W. Dunnill and T. Hasell, *Microporous Mesoporous Mater.*, 2016, 232, 189-195.
20. Sang H. Je, O. Buyukcakir, D. Kim and A. Coskun, *Chem*, 2016, 1, 482-493.
21. D. J. Parker, H. A. Jones, S. Petcher, L. Cervini, J. M. Griffin, R. Akhtar and T. Hasell, *J. Mater. Chem. A*, 2017.

22. S. J. Yang, H. Jung, T. Kim and C. R. Park, *Prog. Nat. Sci.: Mater. Int.,* 2012, 22, 631-638.
23. Y. Li, T. Ben, B. Zhang, Y. Fu and S. Qiu, *Sci. Rep.,* 2013, 3, 2420.
24. Y. Xia, Y. Zhu and Y. Tang, Carbon, 2012, 50, 5543-5553.
25. J. P. Paraknowitsch, A. Thomas and J. Schmidt, *Chem. Commun.* (Cambridge, U. K.), 2011, 47, 8283-8285.
26. L. Qie, W.-M. Chen, Z.-H. Wang, Q.-G. Shao, X. Li, L.-X. Yuan, X.-L. Hu, W.-X. Zhang and Y.-H. Huang, *Adv. Mater.,* 2012, 24, 2047-2050.
27. S. K. Kundu and A. Bhaumik, *ACS Sustainable Chem. Eng.,* 2016, 4, 3697-3703.
28. H. Furukawa and O. M. Yaghi, *J. Am. Chem. Soc.,* 2009, 131, 8875-8883.
29. R. Dawson, D. J. Adams and A. I. Cooper, *Chemical Science,* 2011, 2, 1173-1177.
30. T. Ben, H. Ren, S. Ma, D. Cao, J. Lan, X. Jing, W. Wang, J. Xu, F. Deng, J. M. Simmons, S. Qiu and G. Zhu, *Angew. Chem., Int. Ed.,* 2009, 48, 9457-9460.
31. T. C. Drage, J. M. Blackman, C. Pevida and C. E. Snape, *Energy Fuels,* 2009, 23, 2790-2796.
32. Y. Zhao, L. Zhao, K. X. Yao, Y. Yang, Q. Zhang and Y. Han, *J. Mater. Chem.,* 2012, 22, 19726-19731.
33. G. Srinivas, V. Krungleviciute, Z.-X. Guo and T. Yildirim, *Energy Environ. Sci.,* 2014, 7, 335-342.
34. C. Robertson and R. Mokaya, *Microporous Mesoporous Mater.,* 2013, 179, 151-156.
35. H. Wang, Q. Gao and J. Hu, *J. Am. Chem. Soc.,* 2009, 131, 7016-7022.
36. E. Terrés, B. Panella, T. Hayashi, Y. A. Kim, M. Endo, J. M. Dominguez, M. Hirscher, H. Terrones and M. Terrones, *Chem. Phys. Lett.,* 2005, 403, 363-366.
37. L. Jarup, *British Medical Bulletin,* 2003, 68, 167-182.
38. P. Hadi, M. H. To, C. W. Hui, C. S. K. Lin and G. McKay, *Water Res.,* 2015, 73, 37-55.
39. *National Institute of Standards and Technology,* http://srdata.nist.gov/xps/.

The invention claimed is:

1. A process for the preparation of a sulfur-doped carbonaceous porous material, the process comprising the steps of:
   i) preparing a sulfur-based polymer by reacting elemental sulfur with one or more organic crosslinking agents, wherein the organic crosslinking agent(s) comprises two or more carbon-carbon double bonds;
   ii) carbonising the sulfur-based polymer of step (i) in the presence of at least one porosity enhancement agent selected from one or more of potassium hydroxide (KOH), sodium hydroxide (NaOH), lithium hydroxide (LiOH), rubidium hydroxide (RbOH), caesium hydroxide (CsOH), magnesium hydroxide ($Mg(OH)_2$), calcium hydroxide ($Ca(OH)_2$), potassium carbonate ($K_2CO_3$), sodium carbonate ($Na_2CO_3$), aluminium hydroxide ($Al(OH)_3$), zinc hydroxide ($Zn(OH)_2$), barium hydroxide ($Ba(OH)_2$), phosphoric acid, sodium chloride, calcium chloride, magnesium chloride or zinc chloride;
   wherein the mass ratio of sulfur-based polymer to porosity enhancement agent in step (ii) of the process is between 3:1 and 1:3;
   wherein the carbonisation of step (ii) is carried out under an inert atmosphere;
   and wherein the sulfur-doped carbonaceous porous material comprises greater than or equal to 12 wt % sulfur and comprises micropores and mesopores.

2. The process according to claim 1, wherein the porosity enhancement agent is an inorganic base, an inorganic acid or an inorganic salt.

3. The process according to claim 1, wherein the carbonisation of step (ii) is conducted at a temperature of between 500° C. and 1000° C.

4. A process according to claim 1, wherein the mass ratio of sulfur-based polymer to porosity enhancement agent in step (ii) of the process is between 2:1 and 1:2.

5. The process according to claim 1, wherein the sulfur-based polymer is carbonised for a duration of between 30 minutes and 5 hours.

6. The process according to claim 1, wherein the mass ratio of elemental sulfur to organic crosslinking agent in step (i) of the process is between 20:80 and 95:5.

7. The process according to claim 1, wherein the one or more organic crosslinking agents of step (i) of the process comprises two double bonds.

8. The process according to claim 1, wherein the sulfur-based polymer of step (i) is formed by reacting elemental sulfur with one organic crosslinking agent.

9. The process according to claim 1, wherein the sulfur-based polymer of step (i) is formed by reacting elemental sulfur with one or more organic crosslinking agents at a temperature of greater than or equal to 120° C.

10. The process according to claim 1, wherein the sulfur-based polymer of step (i) is a solid.

* * * * *